US012759415B2

(12) United States Patent
Isami et al.

(10) Patent No.: US 12,759,415 B2
(45) Date of Patent: Oct. 13, 2026

(54) BATTERY ELECTRIC VEHICLE AND VEHICLE CHARACTERISTICS CUSTOMIZATION SYSTEM

(71) Applicant: TOYOTA JIDOSHA KABUSHIKI KAISHA, Toyota (JP)

(72) Inventors: Yoichiro Isami, Mishima (JP); Tatsuya Imamura, Okazaki (JP); Kenji Mizutani, Toyota (JP); Tsuyoshi Okada, Nagoya (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 18/911,864

(22) Filed: Oct. 10, 2024

(65) Prior Publication Data

US 2025/0170904 A1 May 29, 2025

(30) Foreign Application Priority Data

Nov. 27, 2023 (JP) ................................ 2023-200132

(51) Int. Cl.
*B60L 15/20* (2006.01)
*B60K 35/10* (2024.01)
(Continued)

(52) U.S. Cl.
CPC .............. *B60L 15/20* (2013.01); *B60K 35/10* (2024.01); *B60K 35/28* (2024.01); *B60W 50/085* (2013.01); *B60L 2240/423* (2013.01)

(58) Field of Classification Search
None
See application file for complete search history.

(56) References Cited

U.S. PATENT DOCUMENTS 11,932,118 B2 * 3/2024 Nishimine ................ H02P 6/08
2010/0063697 A1 3/2010 Lindgren et al.
(Continued)

FOREIGN PATENT DOCUMENTS

CA 3113909 A1 5/2022
JP 2008-180853 A 8/2008
(Continued)

*Primary Examiner* — Navid Z. Mehdizadeh
*Assistant Examiner* — Sarah A. Mueller
(74) *Attorney, Agent, or Firm* — Finnegan, Henderson, Farabow, Garrett and Dunner, LLP

(57) ABSTRACT

A battery electric vehicle includes: a driving operation member; a pseudo shifting operation member; and a control device configured to control motion of the battery electric vehicle with respect to an operation of the driving operation member according to an operation state of the pseudo shifting operation member. The control device is configured to acquire customized setting of vehicle characteristics of a manual-transmission internal combustion engine vehicle, change setting of motion characteristics of the battery electric vehicle with respect to the operation of the driving operation member and an operation of the pseudo shifting operation member based on the customized setting when the customized setting is suitable for the battery electric vehicle, and maintain the setting of the motion characteristics at present setting or default setting when the customized setting is not suitable for the battery electric vehicle.

19 Claims, 16 Drawing Sheets

(51) Int. Cl.
*B60K 35/28* (2024.01)
*B60W 50/08* (2020.01)

(56) References Cited

U.S. PATENT DOCUMENTS

| | | | | |
|---|---|---|---|---|
| 2012/0083958 | A1 | 4/2012 | Ballard | |
| 2019/0358535 | A1* | 11/2019 | Chen | A63F 13/803 |
| 2021/0229550 | A1 | 7/2021 | Isami | |
| 2022/0001751 | A1 | 1/2022 | Umetsu et al. | |
| 2022/0041062 | A1* | 2/2022 | Nishimine | B60H 1/249 |
| 2022/0041064 | A1 | 2/2022 | Nishimine et al. | |
| 2022/0041066 | A1 | 2/2022 | Isami et al. | |
| 2022/0063494 | A1* | 3/2022 | Duo' | B60L 15/2054 |
| 2022/0314818 | A1* | 10/2022 | Bernatchez | B60L 15/20 |
| 2023/0294714 | A1 | 9/2023 | Sato et al. | |
| 2023/0356603 | A1 | 11/2023 | Hirao | |

FOREIGN PATENT DOCUMENTS

| | | | |
|---|---|---|---|
| JP | 2019-189069 | A | 10/2019 |
| JP | 2021-118569 | A | 8/2021 |
| JP | 2022-030868 | A | 2/2022 |
| JP | 2022-030872 | A | 2/2022 |
| JP | 2022-036834 | A | 3/2022 |
| JP | 2023-136794 | A | 9/2023 |

* cited by examiner

BATTERY ELECTRIC VEHICLE AND VEHICLE CHARACTERISTICS CUSTOMIZATION SYSTEM

CROSS-REFERENCE TO RELATED APPLICATION

This application claims priority to Japanese Patent Application No. 2023-200132 filed on Nov. 27, 2023, incorporated herein by reference in its entirety.

BACKGROUND

1. Technical Field

The present disclosure relates to a battery electric vehicle that includes an electric motor as a drive source, and to a vehicle characteristics customization system that customizes the vehicle characteristics of the battery electric vehicle.

2. Description of Related Art

Various devices that allow people to enjoy driving simulator video games have been proposed and put into practical use. Japanese Unexamined Patent Application Publication No. 2008-180853 (JP 2008-180853 A), for example, discloses a reaction force device for a driving simulator. This device is configured to detect a steering angle of a steering wheel, and apply a reaction force to the steering wheel based on angle information that indicates the detected steering angle and predetermined friction characteristics.

SUMMARY

In driving simulator video games, a user can customize a virtual vehicle that he/she operates to his/her favorite vehicle characteristics. When preferable vehicle characteristics are obtained through customization, the user can have increased fun if he/she can try such vehicle characteristics on an actual vehicle. Since safety is given priority in the real world, however, vehicle characteristics set in games cannot be reflected without limitation on an actual vehicle.

The present disclosure provides a battery electric vehicle and a vehicle characteristics customization system that enable a user to enjoy customizing vehicle characteristics without causing a situation in which a vehicle becomes unable to travel.

A first aspect of the present disclosure provides a battery electric vehicle that includes an electric motor as a drive source, including: a driving operation member that is used to drive the battery electric vehicle; a pseudo shifting operation member that imitates an operation member that is used to perform a shifting operation of a manual-transmission internal combustion engine vehicle; and a control device configured to control motion of the battery electric vehicle with respect to an operation of the driving operation member according to an operation state of the pseudo shifting operation member. The control device is configured to acquire customized setting of vehicle characteristics of the manual-transmission internal combustion engine vehicle to be replicated by the battery electric vehicle, change setting of motion characteristics of the battery electric vehicle with respect to the operation of the driving operation member and an operation of the pseudo shifting operation member based on the customized setting when the customized setting is suitable for the battery electric vehicle, and maintain the setting of the motion characteristics at present setting or default setting when the customized setting is not suitable for the battery electric vehicle.

In the battery electric vehicle according to the first aspect of the present disclosure, the control device may be configured to present, to a user, a settable range for customizing from the present setting or the default setting.

In the battery electric vehicle according to the first aspect of the present disclosure, the driving operation member may include an accelerator pedal; the pseudo shifting operation member may include a pseudo shifter that imitates a shifter of a manual transmission; and the customized setting may include a relationship among a vehicle speed of a host vehicle, an operation amount of the accelerator pedal, a shift position selected by an operation of the pseudo shifter, and torque of the electric motor.

In the battery electric vehicle according to the first aspect of the present disclosure, the driving operation member may include an accelerator pedal; the pseudo shifting operation member may include a pseudo shifter that imitates a shifter of a manual transmission, and a pseudo clutch operation device that imitates a clutch operation device; and the customized setting may include a relationship among a vehicle speed of a host vehicle, an operation amount of the accelerator pedal, a shift position selected by an operation of the pseudo shifter, an operation amount of the pseudo clutch operation device, and torque of the electric motor.

In the battery electric vehicle according to the first aspect of the present disclosure, the customized setting may include whether the pseudo clutch operating device is used.

In the battery electric vehicle according to the first aspect of the present disclosure, the pseudo shifter may include a pseudo sequential shifter that imitates a sequential shifter of the manual transmission, and a pseudo H-shifter that imitates an H-shifter of the manual transmission; and the customized setting may include whether the pseudo sequential shifter or the pseudo H-shifter is used.

In the battery electric vehicle according to the first aspect of the present disclosure, the customized setting may include at least one of settings of at least one of engine characteristics, shifting characteristics, and suspension characteristics of the manual-transmission internal combustion engine vehicle.

A second aspect of the present disclosure provides a vehicle characteristics customization system that customizes vehicle characteristics of a battery electric vehicle that includes an electric motor as a drive source, a driving operation member that is used for torque control of the electric motor, and a pseudo shifting operation member that imitates an operation member that is used for a shifting operation of a manual-transmission internal combustion engine vehicle, the vehicle characteristics customization system including: a human-machine interface configured to set customized setting of vehicle characteristics of the manual-transmission internal combustion engine vehicle to be replicated by the battery electric vehicle; and a processing circuit configured to communicate with the human-machine interface. The processing circuit is configured to determine whether the customized setting set by using the human-machine interface is suitable for the battery electric vehicle, change setting of motion characteristics of the battery electric vehicle with respect to operations of the driving operation member and the pseudo shifting operation member based on the customized setting when the customized setting is suitable for the battery electric vehicle, and maintain the setting of the motion characteristics at present setting or default setting when the customized setting is not suitable for the battery electric vehicle.

In the vehicle characteristics customization system according to the second aspect of the present disclosure, the human-machine interface may include a touch panel display; and the human-machine interface may be configured to display a characteristics chart that indicates the vehicle characteristics of the manual-transmission internal combustion engine vehicle on the touch panel display, enable a user to alter the characteristics chart on the touch panel display through a touch operation, and accept the altered characteristics chart as the customized setting.

In the vehicle characteristics customization system according to the second aspect of the present disclosure, the processing circuit may be configured to present, to a user, a settable range for customizing from the present setting or the default setting via the human-machine interface.

In the vehicle characteristics customization system according to the second aspect of the present disclosure, the processing circuit may be configured to: record a history of driving performed by a driver using the pseudo shifting operation member; and increase a settable range for the customized setting on the human-machine interface according to the history of driving.

In the vehicle characteristics customization system according to the second aspect of the present disclosure, the human-machine interface may be mounted on a portable terminal configured to be connected to the battery electric vehicle wirelessly or through a wire.

In the vehicle characteristics customization system according to the second aspect of the present disclosure, the processing circuit may be mounted on the battery electric vehicle; and the processing circuit may be configured to determine whether the customized setting downloaded from the portable terminal is suitable for the battery electric vehicle.

In the vehicle characteristics customization system according to the second aspect of the present disclosure, a part of the processing circuit may be mounted on the portable terminal; and the part of the processing circuit may be configured to determine, using a filter prepared for each battery electric vehicle, whether the customized setting set using the human-machine interface is suitable for the battery electric vehicle, and upload the customized setting determined as being suitable for the battery electric vehicle to the battery electric vehicle.

In the vehicle characteristics customization system according to the second aspect of the present disclosure, the human-machine interface may be mounted on a gaming device configured to be connected to the battery electric vehicle wirelessly or through a wire; and the human-machine interface may be configured to enable vehicle characteristics of a virtual vehicle set by a user in a video game that operates on the gaming device to be set as the customized setting.

In the vehicle characteristics customization system according to the second aspect of the present disclosure, the video game may include: a mode to select a battery electric vehicle for which the customized setting is to be uploaded; and a mode to set vehicle characteristics of the virtual vehicle using a filter for the selected battery electric vehicle.

In the vehicle characteristics customization system according to the second aspect of the present disclosure, the human-machine interface may be configured to increase a settable range for the customized setting according to an amount of charge paid for the video game by the user.

In the vehicle characteristics customization system according to the second aspect of the present disclosure, the human-machine interface and the processing circuit may be mounted on the battery electric vehicle.

The battery electric vehicle according to the present disclosure includes a pseudo shifting operation member. Thus, the vehicle characteristics of a manual-transmission internal combustion engine vehicle can be replicated by the battery electric vehicle by controlling motion of the battery electric vehicle with respect to an operation of the driving operation member according to the operation state of the pseudo shifting operation member. With the battery electric vehicle according to the present disclosure, further, the user can customize the setting of the vehicle characteristics of a manual-transmission internal combustion engine vehicle to be replicated by the battery electric vehicle to his/her taste. However, the customized setting is not unconditionally applied to the battery electric vehicle. When the customized setting is not suitable for the battery electric vehicle, the setting of the motion characteristics of the battery electric vehicle with respect to operations of the driving operation member and the pseudo shifting operation member is maintained at the present setting or the default setting. This allows the user to enjoy customizing the vehicle characteristics without causing a situation in which the vehicle becomes unable to travel.

With the vehicle characteristics customization system according to the present disclosure, the user can customize the setting of the vehicle characteristics of a manual-transmission internal combustion engine vehicle to be replicated by the battery electric vehicle to his/her taste using the human-machine interface. However, the customized setting set using the human-machine interface is not unconditionally applied to the battery electric vehicle, and it is determined whether the customized setting is suitable for the battery electric vehicle. When the customized setting is not suitable for the battery electric vehicle, the setting of the motion characteristics of the battery electric vehicle with respect to operations of the driving operation member and the pseudo shifting operation member is maintained at the present setting or the default setting. This allows the user to enjoy customizing the vehicle characteristics without causing a situation in which the vehicle becomes unable to travel.

BRIEF DESCRIPTION OF THE DRAWINGS

Features, advantages, and technical and industrial significance of exemplary embodiments of will be described below with reference to the accompanying drawings, in which like signs denote like elements, and wherein.

DETAILED DESCRIPTION OF EMBODIMENTS

1. Configuration of Power System of Battery Electric Vehicle

Figure 1:
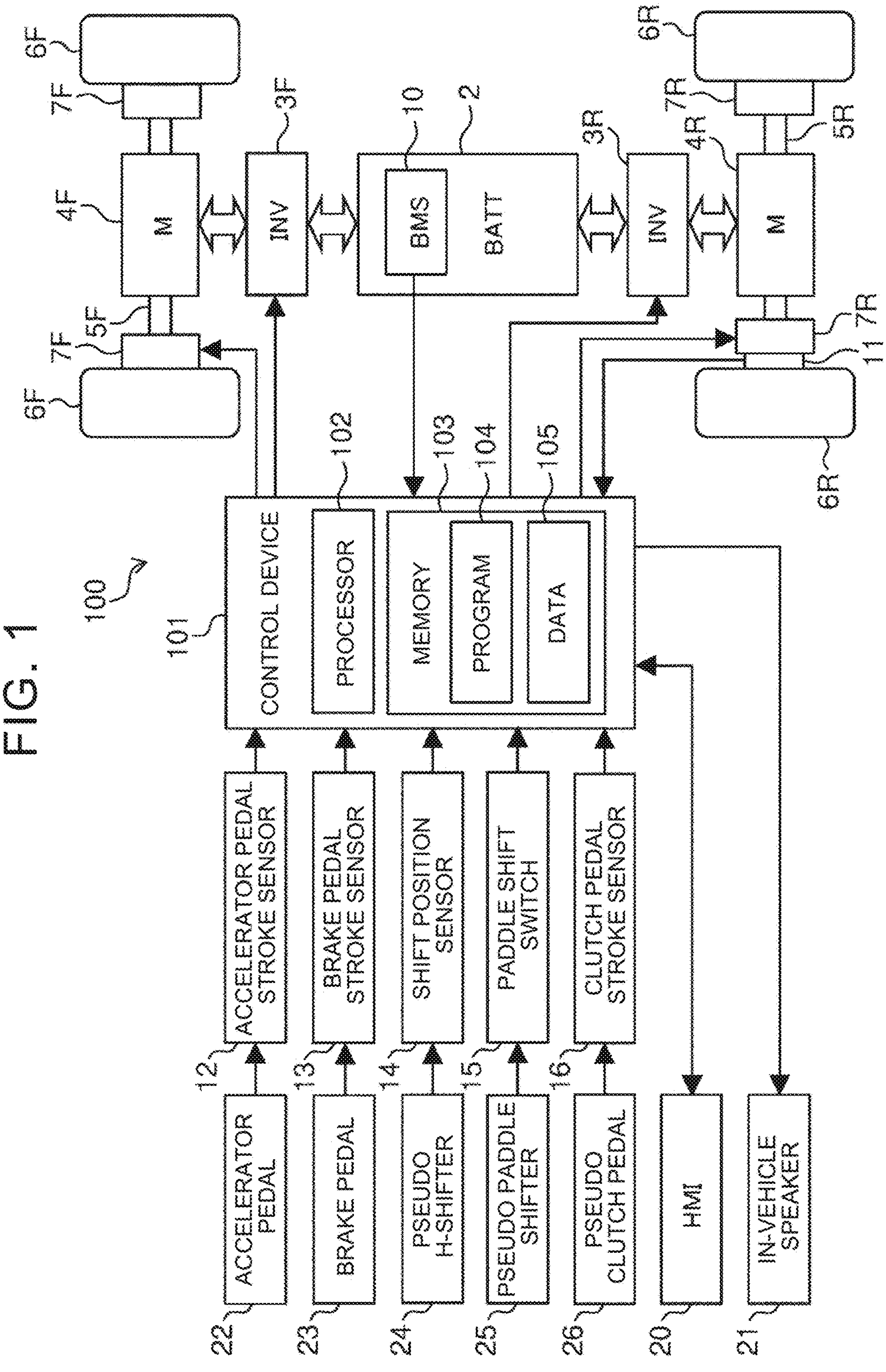
FIG. 1 illustrates the configuration of a battery electric vehicle according to an embodiment of the present disclosure.

FIG. 1 schematically illustrates the configuration of a battery electric vehicle 100 according to an embodiment of the present disclosure. First, the configuration of a power system of the battery electric vehicle 100 will be described with reference to FIG. 1.

The battery electric vehicle 100 includes two electric motors (M) 4F, 4R at the front and rear as power sources for travel. The electric motors 4F, 4R are three-phase alternating current (AC) motors, for example. The front electric motor 4F is connected to front drive shafts 5F that drive front wheels 6F. The rear electric motor 4R is connected to rear drive shafts 5R that drive rear wheels 6R. The front wheels 6F are suspended on electronically controlled right and left front suspensions 7F that are independent of each other. The rear wheels 6R are suspended on electronically controlled right and left rear suspensions 7R that are independent of each other.

The front electric motor 4F and the rear electric motor 4R are equipped with inverters (INV) 3F, 3R, respectively. The front inverter 3F and the rear inverter 3R are each connected to a battery (BATT) 2. The battery 2 stores electrical energy for driving the electric motors 4F, 4R. That is, the battery electric vehicle 100 is a battery electric vehicle (BEV) that travels on the electrical energy stored in the battery 2. The inverters 3F, 3R are voltage inverters, for example, and control torque of the electric motors 4F, 4R, respectively, through pulse width modulation (PWM) control.

2. Configuration of Control System of Battery Electric Vehicle

Subsequently, the configuration of a control system of the battery electric vehicle 100 will be described with reference to FIG. 1.

The battery electric vehicle 100 includes a battery management system (BMS) 10. The battery management system 10 is a device that monitors the cell voltage, current, temperature, etc. of the battery 2. The battery management system 10 has a function to estimate a state of charge (SOC) of the battery 2.

The battery electric vehicle 100 includes a vehicle speed sensor 11. At least one of wheel speed sensors (not illustrated) provided for the right and left front wheels 6F and the right and left rear wheels 6R is used as the vehicle speed sensor 11. The battery electric vehicle 100 also includes an accelerator pedal stroke sensor 12. The accelerator pedal stroke sensor 12 is provided for an accelerator pedal 22, and outputs a signal that indicates the amount of depression of the accelerator pedal 22, that is, the accelerator operation amount. The battery electric vehicle 100 further includes a brake pedal stroke sensor 13. The brake pedal stroke sensor 13 is provided for a brake pedal 23, and outputs a signal that indicates the amount of depression of the brake pedal 23, that is, the brake operation amount.

The accelerator pedal 22 and the brake pedal 23 are driving operation members that are used to drive the battery electric vehicle 100. Besides these driving operation members, the battery electric vehicle 100 includes pseudo shifting operation members that imitate operation members that are used to perform shifting operations of a manual-transmission internal combustion engine vehicle. The pseudo shifting operation members include a pseudo H-shifter 24, a pseudo paddle shifter 25, and a pseudo clutch pedal 26 to be described below.

The pseudo H-shifter 24 is a dummy that is different from a real H-shifter. The pseudo H-shifter 24 has a structure that imitates a shift stick provided in a console, and can be moved between shift positions along an H-pattern gate. Since the battery electric vehicle 100 does not include an actual transmission, however, the shift positions of the pseudo H-shifter 24 are virtual shift positions. The pseudo H-shifter 24 is provided with a shift position sensor 14. The shift position sensor 14 outputs a signal that indicates a shift position selected using the pseudo H-shifter 24.

The pseudo paddle shifter 25 is a dummy that is different from a real paddle shifter that is a type of sequential shifter. The pseudo paddle shifter 25 has a structure that imitates a shift paddle attached to a steering wheel, and includes right and left paddles that can be moved independently. The pseudo paddle shifter 25 is provided with a paddle shift switch 15. The paddle shift switch 15 outputs an upshift signal when the right paddle is pulled, and outputs a downshift signal when the left paddle is pulled.

The pseudo clutch pedal 26 is a dummy that is different from a real clutch pedal. The pseudo clutch pedal 26 has a structure that imitates a clutch pedal provided in a conventional manual-transmission internal combustion engine vehicle. For example, the pseudo clutch pedal 26 includes a reaction force mechanism that generates a reaction force against the depression by a driver. The position of the pseudo clutch pedal 26 at the time when a depression force is not applied is the start end position of the pseudo clutch pedal 26, and the position of the pseudo clutch pedal 26 at the time when the pseudo clutch pedal 26 is fully depressed is the terminal end position of the pseudo clutch pedal 26. The driver can operate the pseudo clutch pedal 26 from the start end position to the terminal end position against the reaction force from the reaction force mechanism. The pseudo clutch pedal 26 is provided with a clutch pedal stroke sensor 16. The clutch pedal stroke sensor 16 outputs a signal that indicates the amount of depression of the pseudo clutch pedal 26. Since the battery electric vehicle 100 does not include an actual clutch, the operation amount of the pseudo clutch pedal 26, that is, the clutch operation amount, is a virtual clutch operation amount.

While the pseudo clutch pedal 26 is a pedal-type operation device to be operated by a foot, a lever-type operation device or a dial-type operation device to be operated by a hand may be provided as a pseudo clutch operation device. The pseudo clutch operation device may be of various structures as long as the pseudo clutch operation device can be operated by the driver from the start end position to the terminal end position against a reaction force and allows the driver to have an operation feel similar to that of a clutch pedal provided in the conventional manual-transmission internal combustion engine vehicle with his/her foot or hand.

The battery electric vehicle 100 also includes a human-machine interface (HMI) 20 as an interface with the driver, and an in-vehicle speaker 21. The HMI 20 includes a touch panel display. The HMI 20 displays information on the touch panel display, and accepts inputs from the driver through touch operations on the touch panel display. The in-vehicle speaker 21 can provide information to the driver by voice, and output a pseudo engine sound to be discussed later.

The battery electric vehicle 100 includes a control device 101. Sensors and control-target devices mounted on the battery electric vehicle 100 are connected to the control device 101 through an in-vehicle network. Besides the battery management system 10, the vehicle speed sensor 11, the accelerator pedal stroke sensor 12, the brake pedal stroke sensor 13, the shift position sensor 14, the paddle shift switch 15, and the clutch pedal stroke sensor 16, various other sensors are mounted on the battery electric vehicle 100.

The control device 101 is typically an electronic control unit (ECU). The control device 101 may be a combination of a plurality of ECUs. The control device 101 includes at least a processor 102 and a memory 103. The memory 103 includes a random access memory (RAM) that temporarily stores data and a read only memory (ROM) that stores a program 104 that is executable by the processor 102 and a variety of data 105 related to the program. The program 104 is composed of a plurality of instruction codes. The processor 102 reads the program 104 and the data 105 from the memory 103, executes the program 104, and generates a control signal based on signals acquired from the sensors. The control device 101 may include one processor 102, or may include a plurality of processors 102.

The control device 101 can control the battery electric vehicle 100 in various control modes. The driver can select a control mode by performing a touch operation on the touch panel display of the HMI 20. Specifically, when a touch operation is performed on the touch panel display of the HMI 20, one or more programs 104 associated with the touch operation are read from the memory 103 and executed by the processor 102. The control modes of the battery electric vehicle 100 by the control device 101 that can be selected by the driver through an operation of the HMI 20 will be described below.

3. Control Modes of Battery Electric Vehicle

Figure 2:
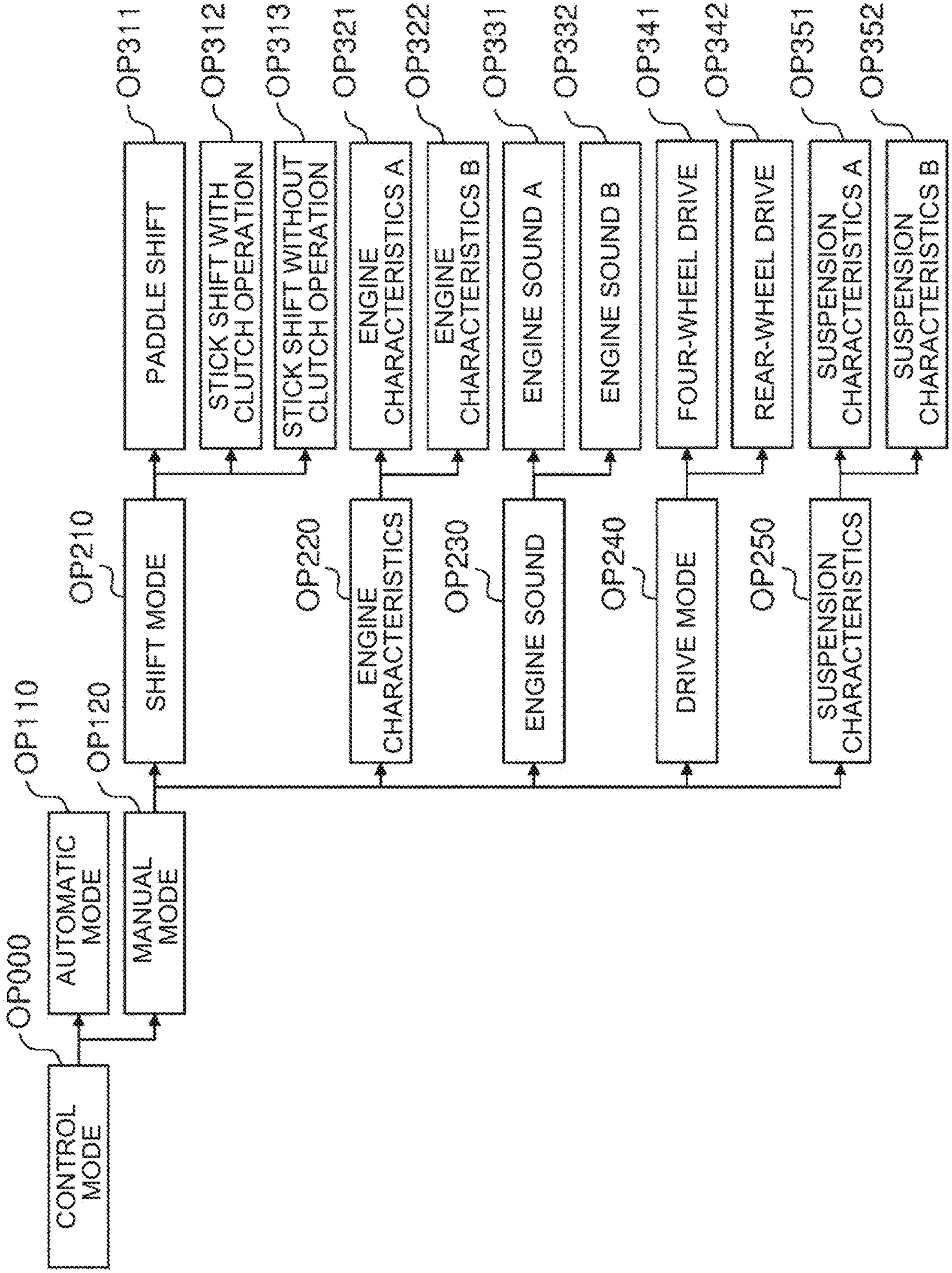
FIG. 2 is a tree diagram illustrating an example of a control mode of the battery electric vehicle that can be selected by a control device.

FIG. 2 is a tree diagram illustrating an example of a control mode of the battery electric vehicle 100 that can be selected by the control device 101. A selection screen is displayed on the touch panel display of the HMI 20 according to the control tree illustrated in FIG. 2.

An option "control mode" OP000 is displayed on the initial screen of the HMI 20. When the option "control mode" OP000 is selected, options "automatic mode" OP110 and "manual mode" OP120 are displayed on the touch panel display. When the option "automatic mode" OP110 is selected, the control mode of the battery electric vehicle 100 is switched to an automatic mode. The automatic mode is a control mode for driving the battery electric vehicle 100 as a normal BEV. In the automatic mode, the driver can basically drive the battery electric vehicle 100 only by operating the accelerator pedal 22, the brake pedal 23, and the steering wheel (not illustrated). In the automatic mode, shift operations of the pseudo H-shifter 24, shift operations of the pseudo paddle shifter 25, and clutch operations of the pseudo clutch pedal 26 are disabled.

When the option "manual mode" OP120 is selected, the control mode of the battery electric vehicle 100 is switched to a manual mode. The manual mode is a control mode for causing the battery electric vehicle 100 to operate like a manual-transmission internal combustion engine vehicle. When the option "manual mode" OP120 is selected, options "shift mode" OP210, "engine characteristics" OP220, "engine sound" OP230, "drive mode" OP240, and "suspension characteristics" OP250 are displayed on the touch panel display. The driver can determine the characteristics of a manual-transmission internal combustion engine vehicle to be replicated by the battery electric vehicle 100, by combining the options OP210 to OP250 as appropriate.

The option "shift mode" OP210 is an option to select a shift mode of a manual transmission when the battery electric vehicle 100 is caused to operate like a manual-transmission internal combustion engine vehicle. When the option "shift mode" OP210 is selected, options "paddle shift" OP311, "stick shift with clutch operation" OP312, and "stick shift without clutch operation" OP313 are displayed on the touch panel display. When the option "paddle shift" OP311 is selected, the shift mode of the manual transmission to be replicated by the battery electric vehicle 100 is switched to a paddle shift mode. The paddle shift mode is a mode in which the pseudo paddle shifter 25 is used for shift operations. In the paddle shift mode, shift operations of the pseudo H-shifter 24 are disabled. In the paddle shift mode, motion made when the gear ratio of the manual transmission is changed is replicated by a shift operation of the pseudo paddle shifter 25. Clutch operations in a real paddle-shift manual transmission are automatically performed by a robot. Therefore, no clutch operations of the pseudo clutch pedal 26 are required in the paddle shift mode. In the paddle shift mode, clutch operations of the pseudo clutch pedal 26 are disabled.

When the option "stick shift with clutch operation" OP312 is selected, a stick shift with clutch operation mode is selected. The stick shift with clutch operation mode is a mode in which the pseudo H-shifter 24 and the pseudo clutch pedal 26 are used for shift operations. In this mode, motion made when the gear ratio of the manual transmission is changed is replicated by a shift operation of the pseudo H-shifter 24 and a clutch operation of the pseudo clutch pedal 26. In this mode, in addition, shift operations of the pseudo paddle shifter 25 are disabled.

When the option "stick shift without clutch operation" OP313 is selected, a stick shift without clutch operation mode is selected. The stick shift without clutch operation mode is a mode in which the pseudo clutch pedal 26 is not used and only the pseudo H-shifter 24 is used for shift operations. Real manual transmissions of an H-shifter type also include ones in which clutch operations are performed by the driver himself/herself and ones in which clutch operations are performed by a robot. In this mode, motion made when the gear ratio of the manual transmission is changed is replicated by a shift operation of the pseudo H-shifter 24. In this mode, in addition, shift operations of the pseudo paddle shifter 25 and clutch operations of the pseudo clutch pedal 26 are disabled.

The option "engine characteristics" OP220 is an option to select the characteristics of an internal combustion engine when the battery electric vehicle 100 is caused to operate like a manual-transmission internal combustion engine vehicle. When the option "engine characteristics" OP220 is selected, an option "engine characteristics A" OP321 and an option "engine characteristics B" OP322 are displayed on the touch panel display, for example. The engine characteristics A and the engine characteristics B are different engine characteristics. The engine characteristics A and B may be set to engine characteristics of a low-to-medium rotation engine, a high-rotation engine, and an all-range engine, for example, as default settings.

The option "engine sound" OP230 is an option to select an engine sound to be replicated by the battery electric vehicle 100. When the option "engine sound" OP230 is selected, an option "engine sound A" OP331 and an option "engine sound B" OP332 are displayed on the touch panel display. The engine sound A and the engine sound B are different engine sounds. The engine sounds A and B may be set to engine sounds of a supercharged inline-4 engine, a flat-6 engine, and a V-12 engine, for example, as default settings.

The option "drive mode" OP240 is an option to select a drive mode of the battery electric vehicle 100. When the option "drive mode" OP240 is selected, options "four-wheel drive" OP341 and "rear-wheel drive" OP342 are displayed on the touch panel display. When the option "four-wheel drive" OP341 is selected, the drive mode of the battery electric vehicle 100 is switched to a four-wheel drive mode. In the four-wheel drive mode, the front wheels 6F are driven by the front electric motor 4F, and the rear wheels 6R are driven by the rear electric motor 4R. The torque distribution between the front wheels 6F and the rear wheels 6R can be fixed or made variable by controlling the electric motors 4F, 4R using the inverters 3F, 3R. When the option "rear-wheel drive" OP342 is selected, the drive mode of the battery electric vehicle 100 is switched to a rear-wheel drive mode. In the rear-wheel drive mode, only the rear wheels 6R are driven by the rear electric motor 4R. The drive mode of the battery electric vehicle 100 may include an option of a front-wheel drive mode in which only the front wheels 6F are driven by the front electric motor 4F, instead of or in addition to the rear-wheel drive mode.

The option "suspension characteristics" OP250 is an option to select the suspension characteristics of the battery electric vehicle 100. When the option "suspension characteristics" OP250 is selected, an option "suspension characteristics A" OP351 and an option "suspension characteristics B" OP352 are displayed on the touch panel display. The damping forces of the suspensions 7F, 7R are different between the suspension characteristics A and the suspension characteristics B. The suspension characteristics A and B may be set to soft, medium, and hard suspension characteristics, for example, as default settings.

The driver can switch the control mode of the battery electric vehicle 100 according to his/her preference by operating the touch panel display of the HMI 20 according to the control tree described above. The switchable control modes include modes related to travel control of the battery electric vehicle 100 and modes related to sound control of the battery electric vehicle 100. Specifically, the modes related to the option "engine sound" OP230 are the modes related to sound control, and the remaining modes are the modes related to travel control. In the following sections, the travel control and sound control of the battery electric vehicle 100 by the control device 101 will be described.

4. Travel Control of Battery Electric Vehicle

Figure 3:
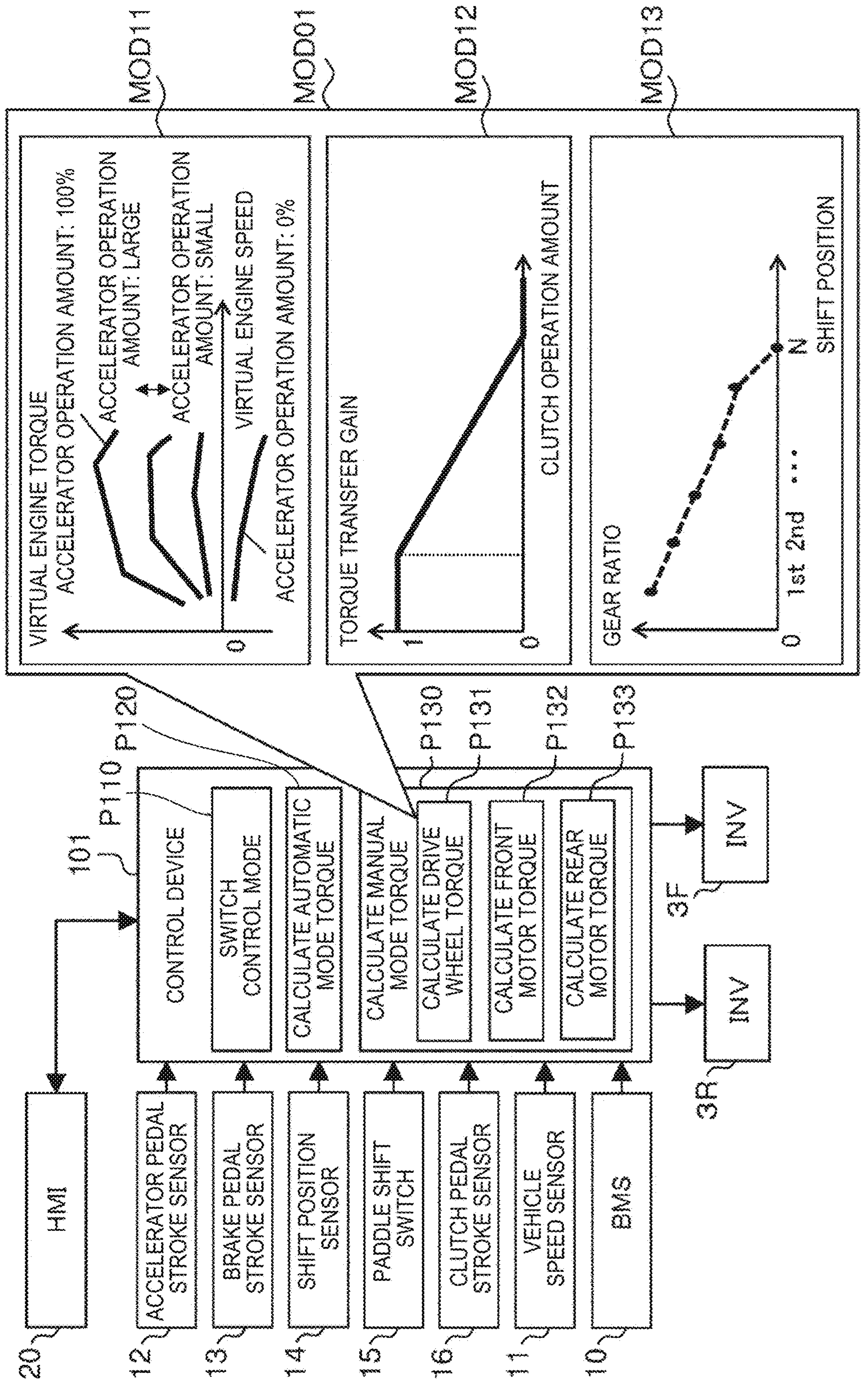
FIG. 3 illustrates the configuration of the control device related to travel control for the battery electric vehicle.

FIG. 3 illustrates the configuration of the control device 101 related to travel control for the battery electric vehicle 100. Specifically, FIG. 3 illustrates a configuration related to torque control, in particular, of the travel control. The processor 102 functions as a travel control device when the processor 102 executes one or more travel control programs 104 stored in the memory 103.

A control mode signal is input from the HMI 20 to the control device 101 that functions as a travel control device. The control mode signal includes information about the control mode selected by the driver. The control device 101 executes a process P110 based on the control mode signal. In the process P110, the control mode is switched according to the control mode signal. Switching of the control mode that particularly affects the travel control is switching between the automatic mode and the manual mode.

When the control mode is switched to the automatic mode, the control device 101 executes a process P120 of calculating torque in the automatic mode. In the process P120, the control device 101 acquires a vehicle speed from a signal from the vehicle speed sensor 11, and acquires an accelerator operation amount from a signal from the accelerator pedal stroke sensor 12. The control device 101 has a motor torque map in which an accelerator operation amount and a vehicle speed are used as parameters. The control device 101 inputs the vehicle speed and the accelerator operation amount to the motor torque map, and controls the inverters 3F, 3R so as to cause the electric motors 4F, 4R to generate the torque obtained from the motor torque map.

When the control mode is switched to the manual mode, the control device 101 executes a process P130 of calculating torque in the manual mode. The process P130 includes a process P131 of calculating torque to be generated by drive wheels. The process P130 also includes a process P132 and a process P133. The process P132 is a process of calculating torque to be generated by the front electric motor 4F, and the process P133 is a process of calculating torque to be generated by the rear electric motor 4R. The processes P132 and P133 are performed according to the drive wheel torque calculated in the process P130 and the torque distribution between the front wheels 6F and the rear wheels 6R.

A vehicle model MOD01 is used to calculate the drive wheel torque in the process P131. The vehicle model MOD01 includes an engine model MOD11, a clutch model MOD12, and a transmission model MOD13. An engine, a clutch, and a transmission virtually implemented by the vehicle model MOD01 will be referred to as a "virtual engine", a "virtual clutch", and a "virtual transmission", respectively. The engine model MOD11 models the virtual engine. The clutch model MOD12 models the virtual clutch. The transmission model MOD13 models the virtual transmission.

The engine model MOD11 calculates a virtual engine speed and virtual engine torque. The virtual engine speed is calculated from the vehicle speed, the total speed reduction ratio, and the slip rate of the virtual clutch. The virtual engine torque is calculated from the virtual engine speed and the accelerator operation amount. The vehicle speed is acquired from a signal from the vehicle speed sensor 11. The accelerator operation amount is acquired from a signal from the accelerator pedal stroke sensor 12. The total speed reduction ratio is a numerical value obtained by multiplying the gear ratio of the virtual transmission by a speed reduction ratio determined by the mechanical structure from the virtual transmission to the drive wheels. In the engine model MOD11, the relationship between the virtual engine speed and the virtual engine torque is prescribed for each accelerator operation amount. The driver can select the engine characteristics of the engine model MOD11 by operating the HMI 20.

The clutch model MOD12 calculates a torque transfer gain. The torque transfer gain is a gain for calculating the degree of transfer of torque of the virtual clutch according to the clutch operation amount. When the stick shift with clutch operation mode is selected as the shift mode, the clutch operation amount is acquired from a signal from the clutch pedal stroke sensor 16. The clutch operation amount is 0% at the start end position of the pseudo clutch pedal 26, and is 100% at the terminal end position of the pseudo clutch pedal 26. The clutch model MOD12 gives the torque transfer gain with respect to the clutch operation amount. The torque transfer gain is converted into the clutch torque capacity of the virtual clutch, that is, the virtual clutch torque capacity. Virtual clutch torque to be input from the virtual clutch to the virtual transmission is calculated based on a comparison between the virtual clutch torque capacity and the virtual engine torque calculated by the engine model MOD11. Meanwhile, the clutch model MOD12 calculates the slip rate by subtracting the torque transfer gain from 1. The slip rate is used by the engine model MOD 11 to calculate the virtual engine speed.

When the paddle shift mode is selected as the shift mode, the clutch operation amount to be input to the clutch model MOD12 is calculated using a clutch operation model. Also when the stick shift without clutch operation mode is selected as the shift mode, the clutch operation amount to be input to the clutch model MOD12 is calculated using the clutch operation model. The clutch operation model is a model that simulates a clutch operation by a model driver. When the paddle shift mode is selected, the vehicle speed, the virtual engine speed, and a signal from the paddle shift switch 15 are input to the clutch operation model. When the stick shift without clutch operation mode is selected, the vehicle speed, the virtual engine speed, and a signal from the shift position sensor 14 are input to the clutch operation model.

The signal from the paddle shift switch 15 and the signal from the shift position sensor 14 are used to determine the timing of a clutch operation. When a shift operation by the driver is detected based on the signal from the paddle shift switch 15 or the signal from the shift position sensor 14, the clutch operation model maximizes the clutch opening amount to disengage the virtual clutch. The vehicle speed and the virtual engine speed are used to calculate the clutch operation amount. The clutch operation model calculates the clutch operation amount based on the difference between the rotational speed of an input shaft of the virtual transmission calculated from the vehicle speed and the virtual engine speed, so as to smoothly match the rotational speed of the input shaft of the virtual transmission with the virtual engine speed.

The transmission model MOD13 calculates a virtual gear ratio. The virtual gear ratio is a gear ratio determined by the virtual shift position of the virtual transmission. The virtual gear ratio is set for each shift position. The virtual gear ratio is highest for a first gear, and becomes lower in the order of a second gear, a third gear, a fourth gear, . . . . In each stick shift mode, the shift positions are in one-to-one correspondence with signals from the shift position sensor 14. In the paddle shift mode, the shift position is shifted up by one position in response to an upshift signal from the paddle shift switch 15, and the shift position is shifted down by one position in response to a downshift signal from the paddle shift switch 15. While the number of shift positions is physically determined with the pseudo H-shifter 24, there is no physical limit on the number of shift positions with the pseudo paddle shifter 25. Accordingly, setting of the transmission model MOD13 may be made different between the stick shift mode and the paddle shift mode such that the number of shift positions in the paddle shift mode is larger than the number of shift positions in the stick shift mode.

The transmission model MOD13 calculates virtual transmission torque using the virtual gear ratio and the virtual clutch torque. The virtual transmission torque is virtual torque output from the virtual transmission. The control device 101 controls the inverters 3F, 3R so as to vary output torque of the electric motors 4F, 4R according to the virtual transmission torque. The virtual transmission torque varies discontinuously in response to changes in the virtual gear ratio. Such discontinuous variations in the virtual transmission torque cause torque shocks in the battery electric vehicle 100, allowing the vehicle to act like a vehicle with a stepped transmission.

The vehicle model MOD01 calculates the drive wheel torque from the virtual transmission torque and the speed reduction ratio. When the four-wheel drive mode is selected as the drive mode, the drive wheel torque is the sum of torques applied to the right and left front wheels 6F and the right and left rear wheels 6R. The torque distribution between the front wheels 6F and the rear wheels 6R may be fixed, or may be actively or passively varied. When the rear-wheel drive mode is selected as the drive mode, the drive wheel torque is the sum of torques applied to the right and left rear wheels 6R.

In the process P132, torque (front motor torque) of the front electric motor 4F in the manual mode is calculated by multiplying the drive wheel torque calculated in the process P131 by the torque distribution rate for the front wheels 6F and the speed reduction ratio from an output shaft of the front electric motor 4F to the front wheels 6F. The control device 101 controls the front inverter 3F so as to cause the front electric motor 4F to generate the front motor torque calculated in the process P132.

In the process P133, torque (rear motor torque) of the rear electric motor 4R in the manual mode is calculated by multiplying the drive wheel torque calculated in the process P131 by the torque distribution rate for the rear wheels 6R and the speed reduction ratio from an output shaft of the rear electric motor 4R to the rear wheels 6R. The control device 101 controls the rear inverter 3R so as to cause the rear electric motor 4R to generate the rear motor torque calculated in the process P133.

In the configuration illustrated in FIG. 3, the battery management system 10 and the brake pedal stroke sensor 13 are not necessarily required for the travel control discussed above. When switching of the control mode affects the SOC of the battery 2, however, a signal from the battery management system 10 may be used as information for determining whether to enable switching of the control mode. In the case where the method of operating the battery electric vehicle 100 changes significantly such as when the control mode is switched between the automatic mode and the manual mode, the control mode may be switched on condition that the brake pedal 23 is being depressed. In that case, a signal from the brake pedal stroke sensor 13 can be used as information for determining whether the brake pedal 23 is being depressed.

5. Sound Control of Battery Electric Vehicle

Figure 4:
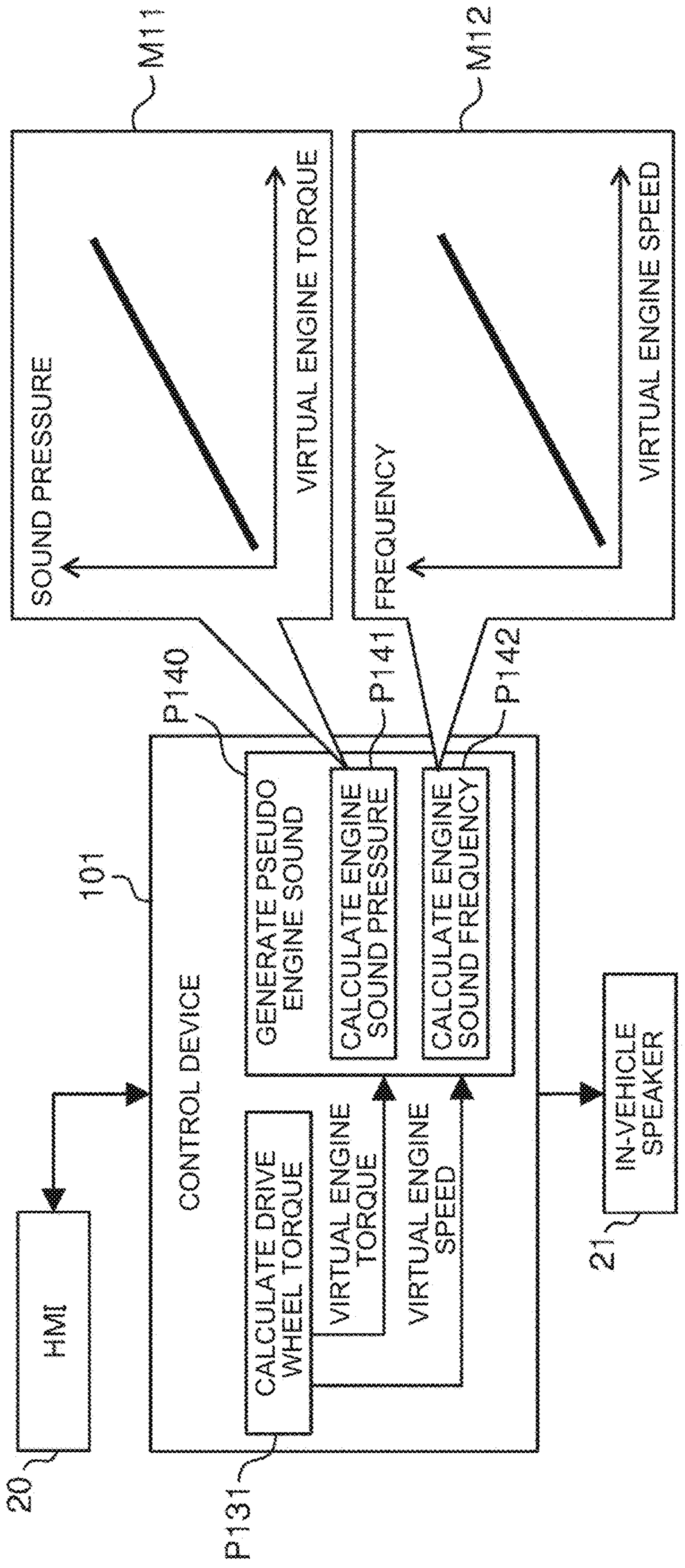
FIG. 4 illustrates the configuration of the control device related to sound control for the battery electric vehicle.

FIG. 4 illustrates the configuration of the control device 101 related to sound control for the battery electric vehicle 100. The processor 102 functions as a sound control device when the processor 102 executes one or more sound control programs 104 stored in the memory 103. The processor 102 that functions as a torque control device and the processor 102 that functions as a sound control device may be different processors, or may be the same processor.

The control device 101 as a sound control device can generate artificially generated sounds from the in-vehicle speaker 21. One of such artificial sounds is a pseudo engine sound that imitates an engine sound of a conventional internal combustion engine vehicle. When a control mode signal that indicates that the manual mode has been selected is input from the HMI 20, the control device 101 as a sound control device performs a process P140. In the process P140, a pseudo engine sound is generated based on the virtual engine torque and virtual engine speed calculated in the process P131.

In the process P140, an engine sound selected using the HMI 20 is used as a sound source of the pseudo engine sound to be generated from the in-vehicle speaker 21. In the process P140, however, the sound from the sound source is not used as it is. In the process P140, the sound pressure of the sound source is changed by an amplifier, for example, and the frequency of the sound source is changed by a frequency modulator, for example.

The process P140 includes a process P141 of calculating an engine sound pressure and a process P142 of calculating an engine sound frequency. In the process P141, the sound pressure of the pseudo engine sound is calculated from the virtual engine torque using a sound pressure map M11. The sound pressure map M11 is prepared such that the sound pressure increases as the virtual engine torque increases. In the process P142, the frequency of the pseudo engine sound is calculated from the virtual engine speed using a frequency map M12. The frequency map M12 is prepared such that the frequency increases as the virtual engine speed increases. The virtual engine torque and the virtual engine speed vary according to an accelerator operation, shift operation, and clutch operation by the driver. Varying the sound pressure and frequency of the pseudo engine sound according to the virtual engine torque and virtual engine speed that vary as described above can make the driver feel as if he or she were actually driving a real manual-transmission internal combustion engine vehicle.

6. Vehicle Characteristics Customization System 6-1. Overview

The driver of the battery electric vehicle 100 can enjoy operating the battery electric vehicle 100 as if operating a manual-transmission internal combustion engine vehicle, by switching the control mode to the manual mode by operating the HMI 20. In addition, the driver can set the vehicle characteristics of a manual-transmission internal combustion engine vehicle to be replicated by the battery electric vehicle 100 to his/her favorite characteristics, by selecting his/her favorite option from among options prepared in advance for various modes such as shift modes and engine characteristics.

However, some users, such as drivers that have fully enjoyed driving in the manual mode, may not be satisfied with settings of vehicle characteristics based on combinations of options prepared in advance. For example, while there are manual-transmission internal combustion engine vehicles with various vehicle characteristics, it is not necessarily possible to reproduce the vehicle characteristics of all the vehicles using combinations of options set in advance. There may be users that desire to reproduce vehicle characteristics that cannot be reproduced using combinations of options set in advance. In addition, there may be users that desire to reproduce a vehicle that does not exist in reality but that he/she has experienced in a video game, for example, using the battery electric vehicle 100. In order to meet demands from such users, the battery electric vehicle 100 includes a vehicle characteristics customization system that allows the users to freely customize the vehicle characteristics of a manual-transmission internal combustion engine vehicle to be replicated by the battery electric vehicle 100. The vehicle characteristics customization system is composed of the control device 101 and the HMI 20.

6-2. Customization Procedure

Figure 5:
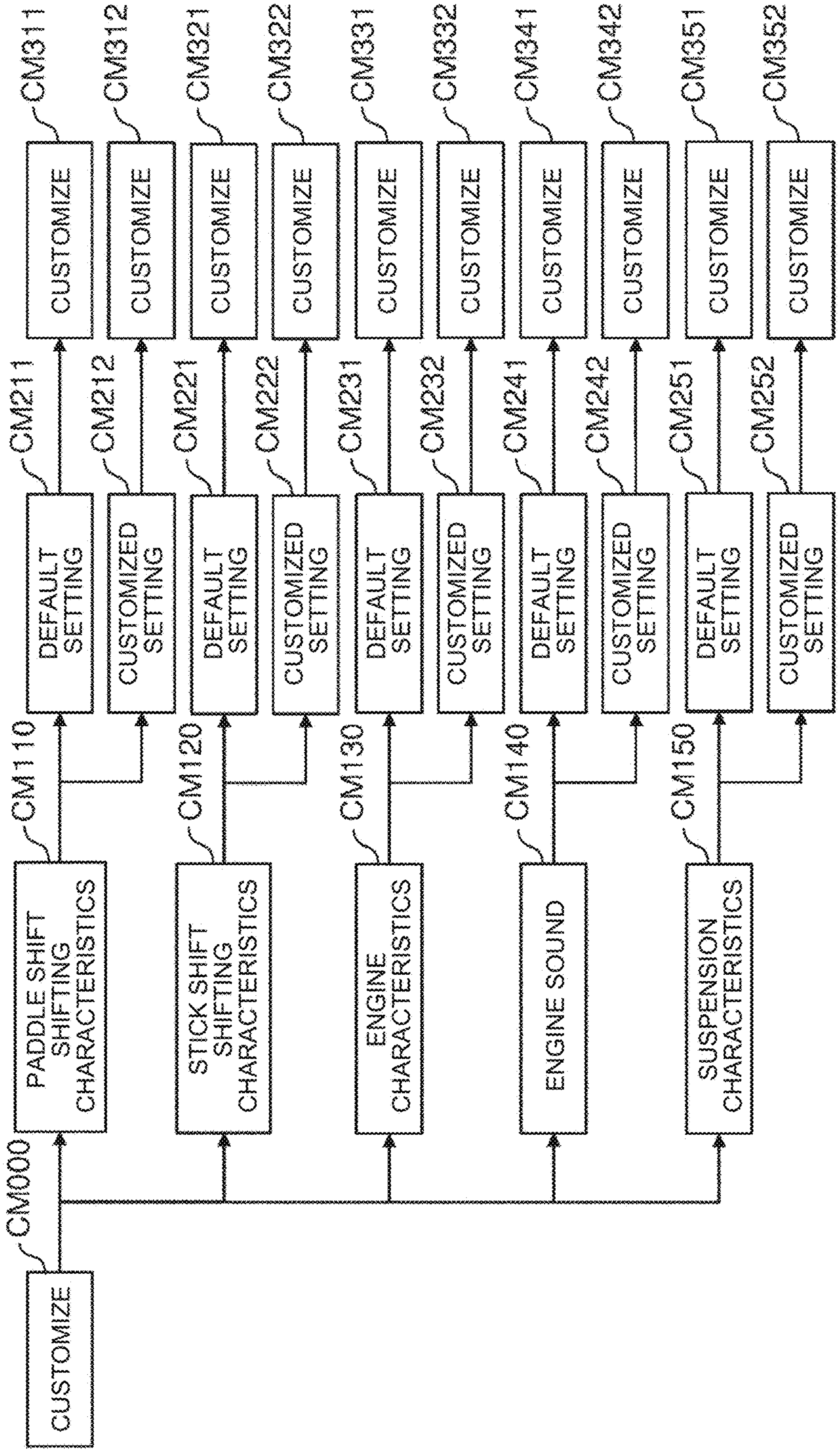
FIG. 5 is a tree diagram illustrating an example of the procedure for operating a human-machine interface (HMI) for customizing vehicle characteristics.

FIG. 5 is a tree diagram illustrating an example of the procedure for operating the HMI 120 for customizing vehicle characteristics. An option "customize" CM000 is displayed on the screen of the HMI 120 at the same level as or a lower level than the option "control mode" OP000. When the option "customize" CM000 is selected, an option "paddle shift shifting characteristics" CM110, an option "stick shift shifting characteristics" CM120, an option "engine characteristics" CM130, an option "engine sound" CM140, and an option "suspension characteristics" CM150 are displayed on the touch panel display. The user can select an option for characteristics desired to be customized, from among the options CM110 to CM150.

When the option "paddle shift shifting characteristics" CM110 is selected, an option "default setting" CM211 and an option "customized setting" CM212 become selectable. When the user selects the option "default setting" CM211, the shifting characteristics in the paddle shift mode are set to default setting set in advance. When the user selects the option "customized setting" CM212, the shifting characteristics in the paddle shift mode are set to customized setting customized by the user. The user can switch the shifting characteristics in the paddle shift mode between the default setting and the customized setting as desired, by switching between the two options.

Customized setting is made available when the user registers the customized setting in the memory 103. Therefore, the option "customized setting" CM212 is not selectable in the initial state. In order to register customized setting, an option "customize" CM311 is selected with the option "default setting" CM211 selected. This selection enables the user to customize the shifting characteristics in the paddle shift mode based on the default setting and register the customized shifting characteristics as the customized setting. Examples of the customization of the shifting characteristics include a change in the gear ratio for each shift position. Examples may further include a change in the number of shift positions. When customized setting has already been registered in the memory 103, it is also possible to select an option "customize" CM312 with the option "customized setting" CM212 selected. This selection enables the user to customize the shifting characteristics in the paddle shift mode based on the currently registered customized setting. The customized shifting characteristics are registered in the memory 103 as new customized setting.

When the option "stick shift shifting characteristics" CM120 is selected, it becomes possible to customize the shifting characteristics in the stick shift with clutch operation mode and the shifting characteristics in the stick shift without clutch operation mode. The procedure for customizing the shifting characteristics in these stick shift modes is the same as the procedure for customizing the shifting characteristics in the paddle shift mode. The user can customize the shifting characteristics in the stick shift modes based on the default setting by selecting an option "default setting" CM221 and then selecting an option "customize" CM321. Meanwhile, the user can customize the shifting characteristics in the stick shift modes based on the currently registered customized setting by selecting an option "customized setting" CM222 and then selecting an option "customize" CM322. Examples of the customization of the shifting characteristics include a change in the gear ratio for each shift position. In the stick shift modes, however, the number of shift positions is physically determined according to the structure of the pseudo H-shifter 24. Therefore, examples of the customization of the shifting characteristics in the stick shift modes do not include a change in the number of shift positions.

When the option "engine characteristics" CM130 is selected, it becomes possible to customize the engine characteristics of a manual-transmission internal combustion engine vehicle to be replicated by the battery electric vehicle 100. The procedure for customizing the engine characteristics is the same as the procedure for customizing the shifting characteristics. The user can customize the engine characteristics based on the default setting by selecting an option "default setting" CM231 and then selecting an option "customize" CM331. Either of the engine characteristics A and the engine characteristics B can be selected as the default setting. Meanwhile, the user can customize the engine characteristics based on the currently registered customized setting by selecting an option "customized setting" CM232 and then selecting an option "customize" CM332. Examples of the customization of the engine characteristics include a change of an engine speed-engine torque map. Examples may further include a change of an accelerator operation amount-engine torque map.

When the option "engine sound" CM140 is selected, it becomes possible to customize the pseudo engine sound of a manual-transmission internal combustion engine vehicle to be replicated by the battery electric vehicle 100. The procedure for customizing the pseudo engine sound is the same as the procedure for customizing the shifting characteristics. The user can customize the pseudo engine sound based on the default setting by selecting an option "default setting" CM241 and then selecting an option "customize" CM341. One of the engine sound A and the engine sound B can be selected as the default setting. Meanwhile, the user can customize the pseudo engine sound based on the currently registered customized setting by selecting an option "customized setting" CM242 and then selecting an option "customize" CM342. Examples of the customization of the engine sound include a change of a sound pressure-engine torque map and a change of a frequency-engine speed map. Examples may further include a change of a sound source.

When the option "suspension characteristics" CM150 is selected, it becomes possible to customize the suspension characteristics. The procedure for customizing the suspension characteristics is the same as the procedure for customizing the shifting characteristics. The user can customize the suspension characteristics based on the default setting by selecting an option "default setting" CM251 and then selecting an option "customize" CM351. Either of the suspension characteristics A and the suspension characteristics B can be selected as the default setting. Meanwhile, the user can customize the suspension characteristics based on the currently registered customized setting by selecting an option "customized setting" CM252 and then selecting an option "customize" CM352. Examples of the customization of the suspension characteristics include a change in the suspension damping force. The suspension damping force for the front wheels and the suspension damping force for the rear wheels may be independently changeable.

6-3. Specific Example of Customization

6-3-1. Method of Customizing Shifting Characteristics

A method of customizing vehicle characteristics when an option "customize" is selected on the HMI 120 will be specifically described with reference to several examples. First, a method of customizing the shifting characteristics in the paddle shift mode will be described as a specific example with reference to FIGS. 6 to 9.

Figure 6:
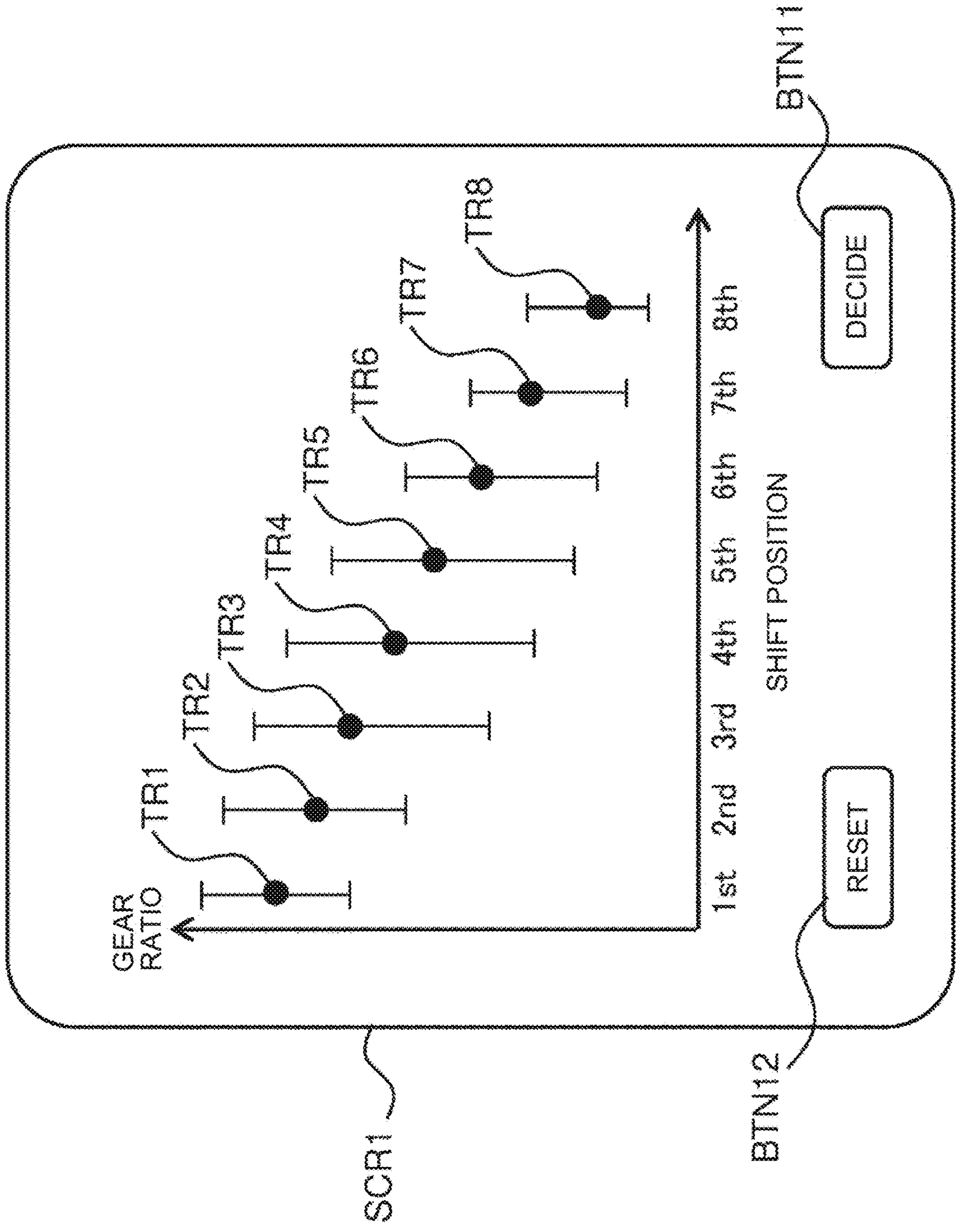
FIG. 6 illustrates an example of a method of customizing shifting characteristics by operating the HMI.

First, when the user selects the option "customize" CM311 or the option "customize" CM312, a screen SCR1 such as that illustrated in FIG. 6 is displayed on the touch panel display of the HMI 120. A characteristics chart of the gear ratio for each shift position is displayed on the screen SCR1. This characteristics chart corresponds to the map of the gear ratio for each shift position that is used by the transmission model MOD13. In the example illustrated in FIG. 6, the paddle shift mode has shift positions from a first gear to an eighth gear. In the characteristics chart, the gear ratio of each shift position is indicated by a black dot. For example, a black dot TR3 indicates the gear ratio of a third gear, and a black dot TR4 indicates the gear ratio of a fourth gear. In the characteristics chart, in addition, the allowable range of the gear ratio of each shift position is indicated by high and low lines. A decide button BTN11 and a reset button BTN12 are displayed on the screen SCR1, together with the characteristics chart.

Figure 7:
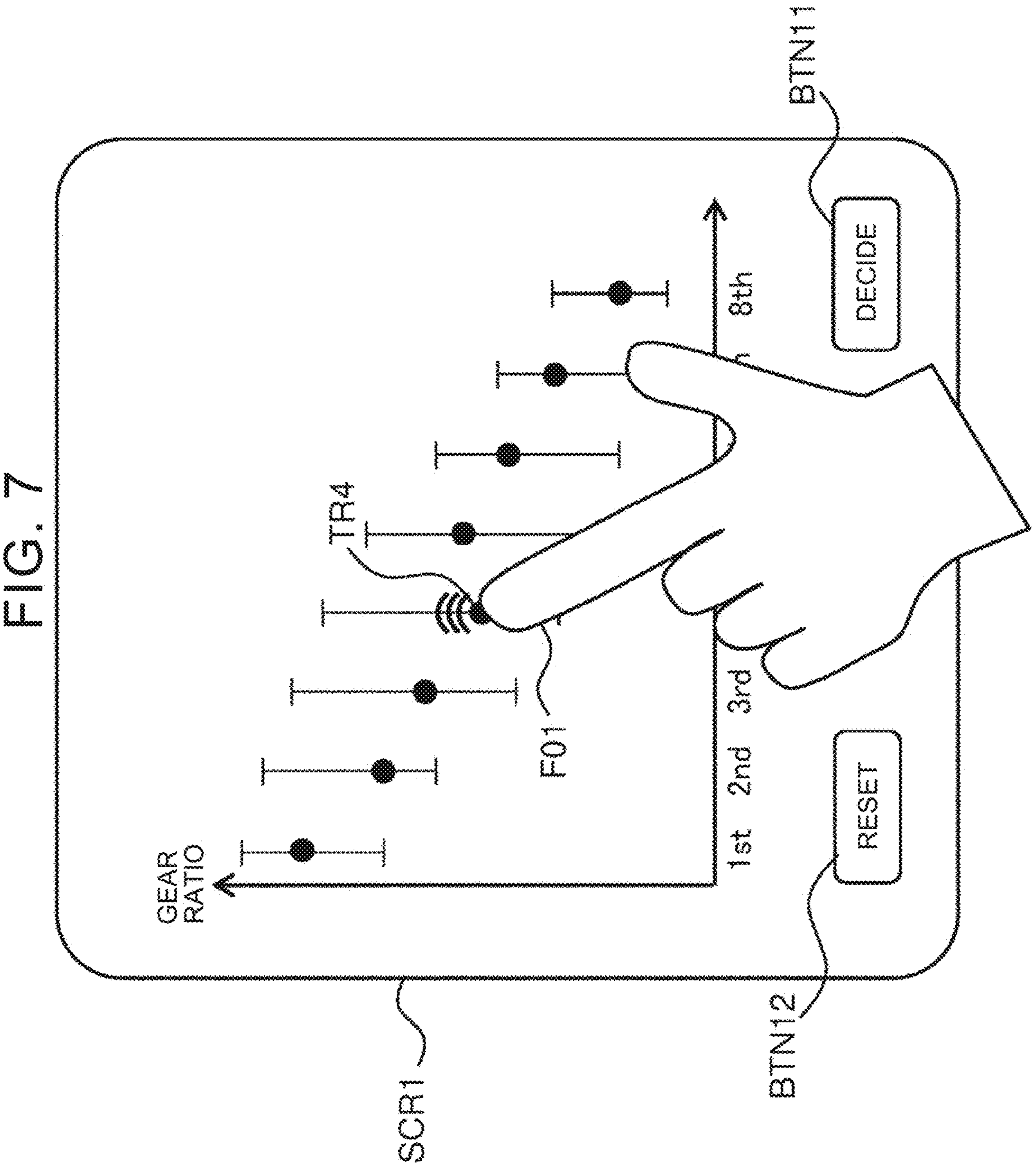
FIG. 7 illustrates an example of the method of customizing shifting characteristics by operating the HMI.
Figure 8:
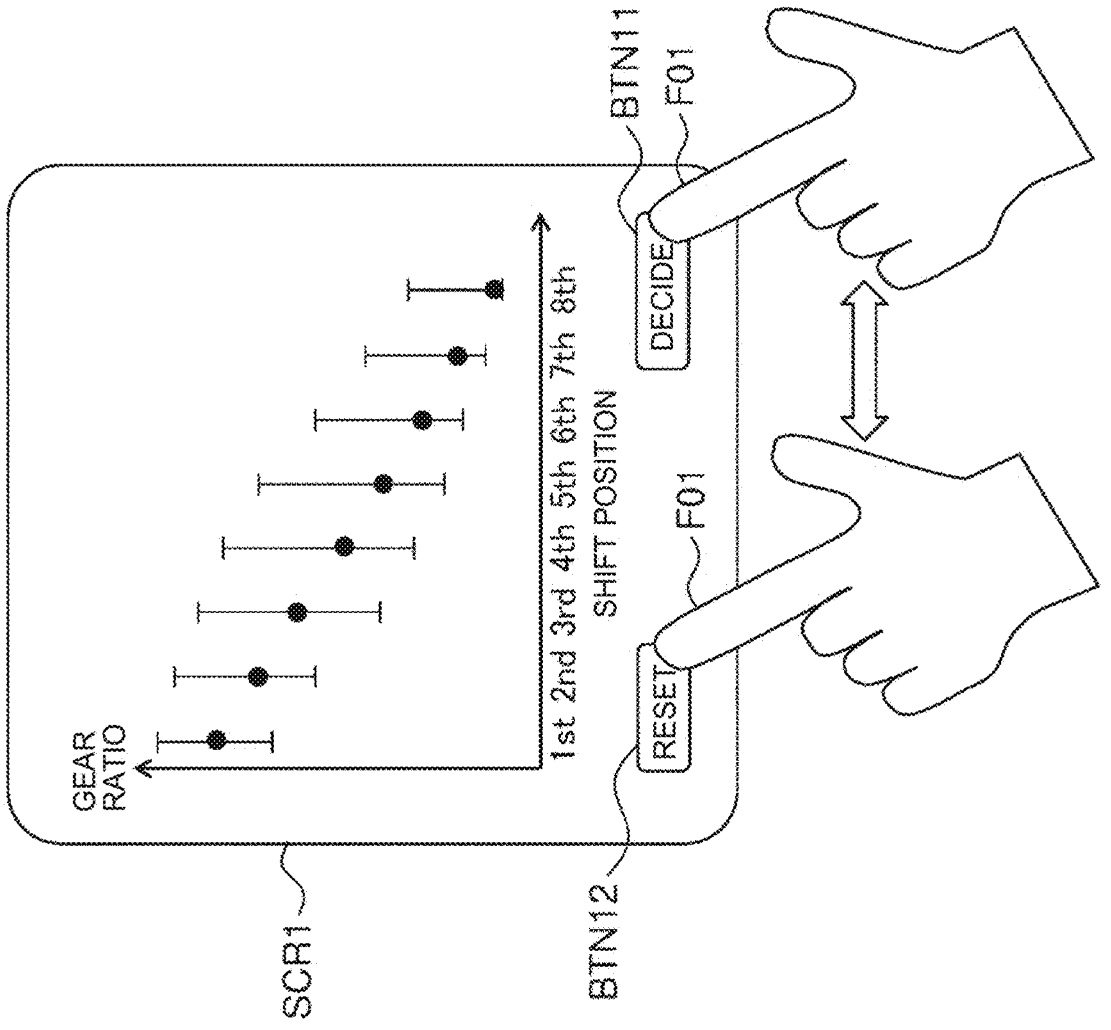
FIG. 8 illustrates an example of a method of customizing shifting characteristics by operating the HMI.
Figure 9:
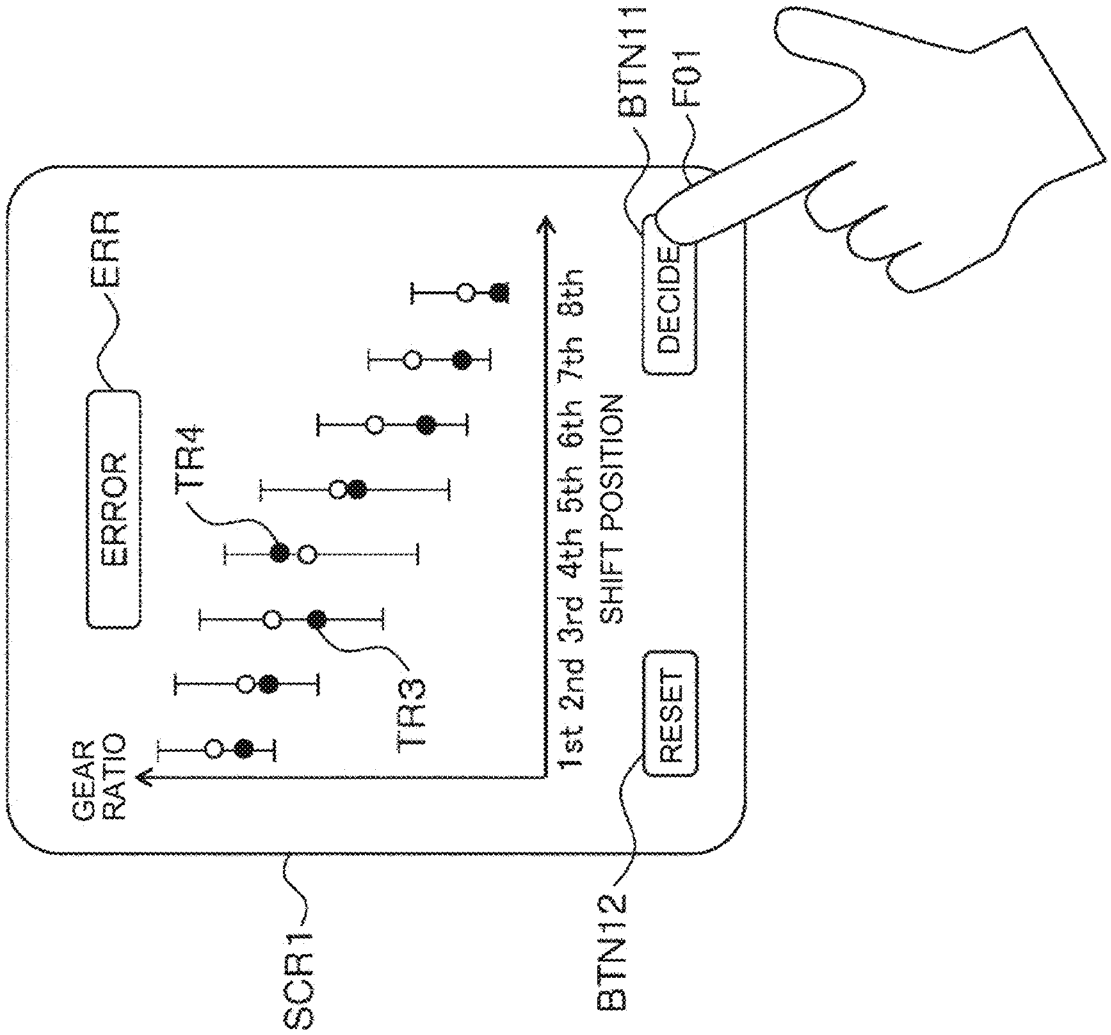
FIG. 9 illustrates an example of the method of customizing shifting characteristics by operating the HMI.

The user can directly edit the characteristics chart of the gear ratio of each shift position on the screen SCR1. For example, when it is desired to lower the gear ratio of the fourth gear, it is only necessary to drag the black dot TR4 downward using a finger F01 to lower the position of the black dot TR4 on the characteristics chart as illustrated in FIG. 7. The gear ratios of the other shift positions also can be individually edited in the same manner. When customizing the shifting characteristics in the paddle shift mode, in addition, it is also possible to remove a black dot corresponding to the eighth gear to form a 7-speed transmission, or add a black dot corresponding to a ninth gear to form a 9-speed transmission, although not illustrated. When customization is successfully made to the user's favorite shifting characteristics as a whole, the customized shifting characteristics are registered in the memory 103 as the customized setting by clicking the decide button BTN11 with the finger F01. When it is desired to start the customization all over again, on the other hand, all the black dots on the characteristics chart are returned to the original positions before the editing by clicking the reset button BTN12 with the finger F01.

By operating the HMI 120 as described above, the user can customize the shifting characteristics of a manual-transmission internal combustion engine vehicle to be replicated by the battery electric vehicle 100 to his/her favorite shifting characteristics. However, it is not always possible to register all the shifting characteristics customized by the user. For example, when a comparison is made between the black dot TR3 and the black dot TR4 illustrated in FIG. 9, the black dot TR4 is set at a higher position than the black dot TR3. This means that the gear ratio of the fourth gear is set to be higher than the gear ratio of the third gear. However, such setting of gear ratios does not allow the battery electric vehicle 100 to travel smoothly, and may cause a situation in which the battery electric vehicle 100 is unable to travel. That is, when the relationship among the gear ratios of the shift positions is evaluated as a whole, the relationship illustrated in FIG. 9 cannot be accepted as setting of the motion characteristics of the battery electric vehicle 100 as a manual-transmission internal combustion engine vehicle. The same applies to the case where the gear ratios of adjacent shift positions are significantly wide, and such shifting characteristics cannot be said to be suitable for the battery electric vehicle 100.

In the vehicle characteristics customization system, conditions of shifting characteristics that are suitable for the battery electric vehicle 100 are determined in advance.

When setting of shifting characteristics customized by the user, that is, customized setting, does not meet the conditions of suitable characteristics, the customized setting is not registered in the memory 103, even if the decide button BTN11 is clicked with the finger F01. In this case, an error indication ERR is displayed on the screen SCR1, and the gear ratios of the shift positions are forcibly returned to the original positions as indicated by white dots on the characteristics chart. Alternatively, the error indication ERR may be simply left displayed on the screen SCR1 until the user clicks the reset button BTN12. In either case, when customized setting is not suitable for the battery electric vehicle 100, registration of the customized setting is canceled, and setting of the motion characteristics of the battery electric vehicle 100 as a manual-transmission internal combustion engine vehicle is maintained at the present setting or the default setting.

6-3-2. Method of Customizing Engine Characteristics

Figure 11:
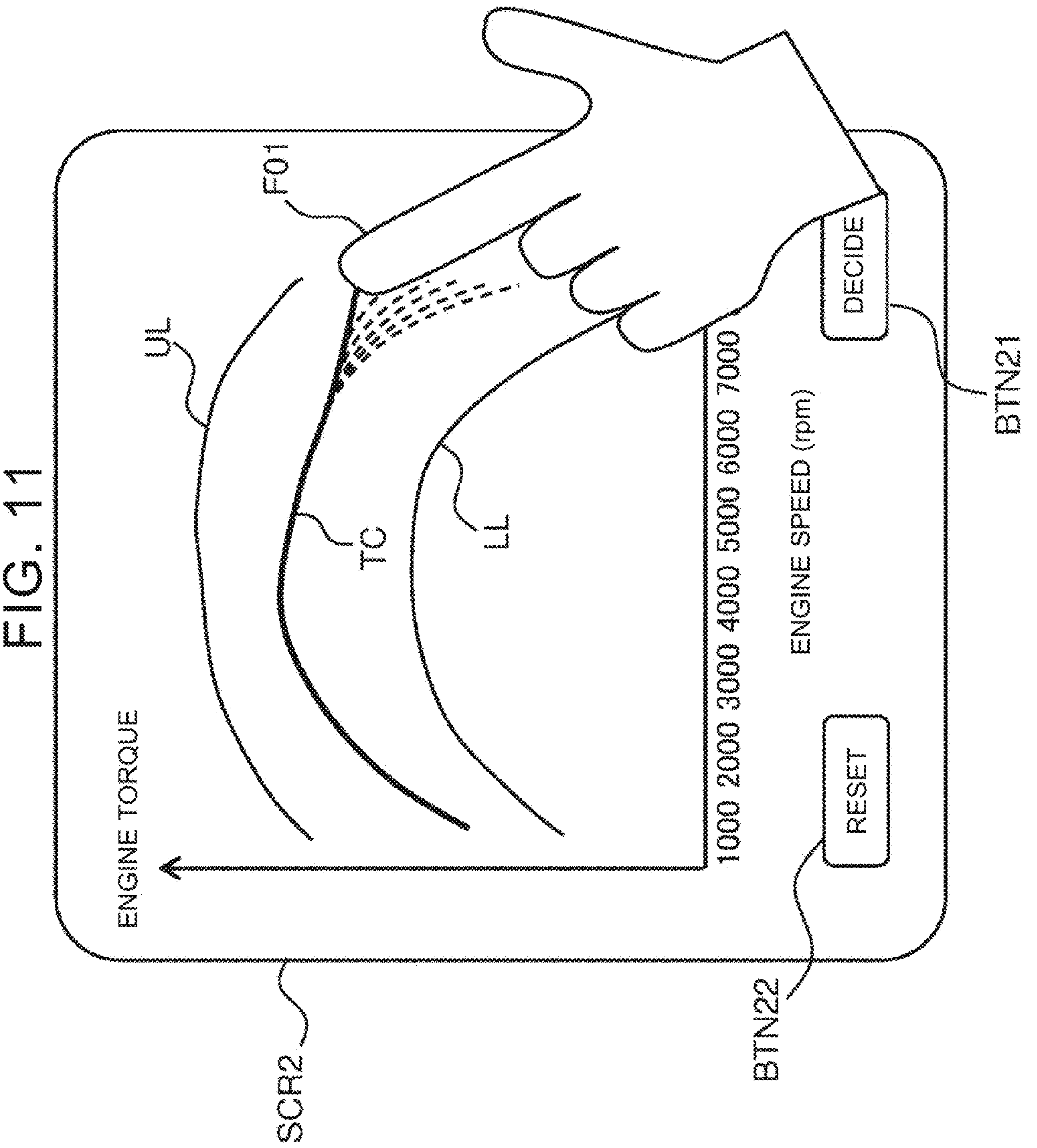
FIG. 11 illustrates an example of the method of customizing engine characteristics by operating the HMI.
Figure 12:
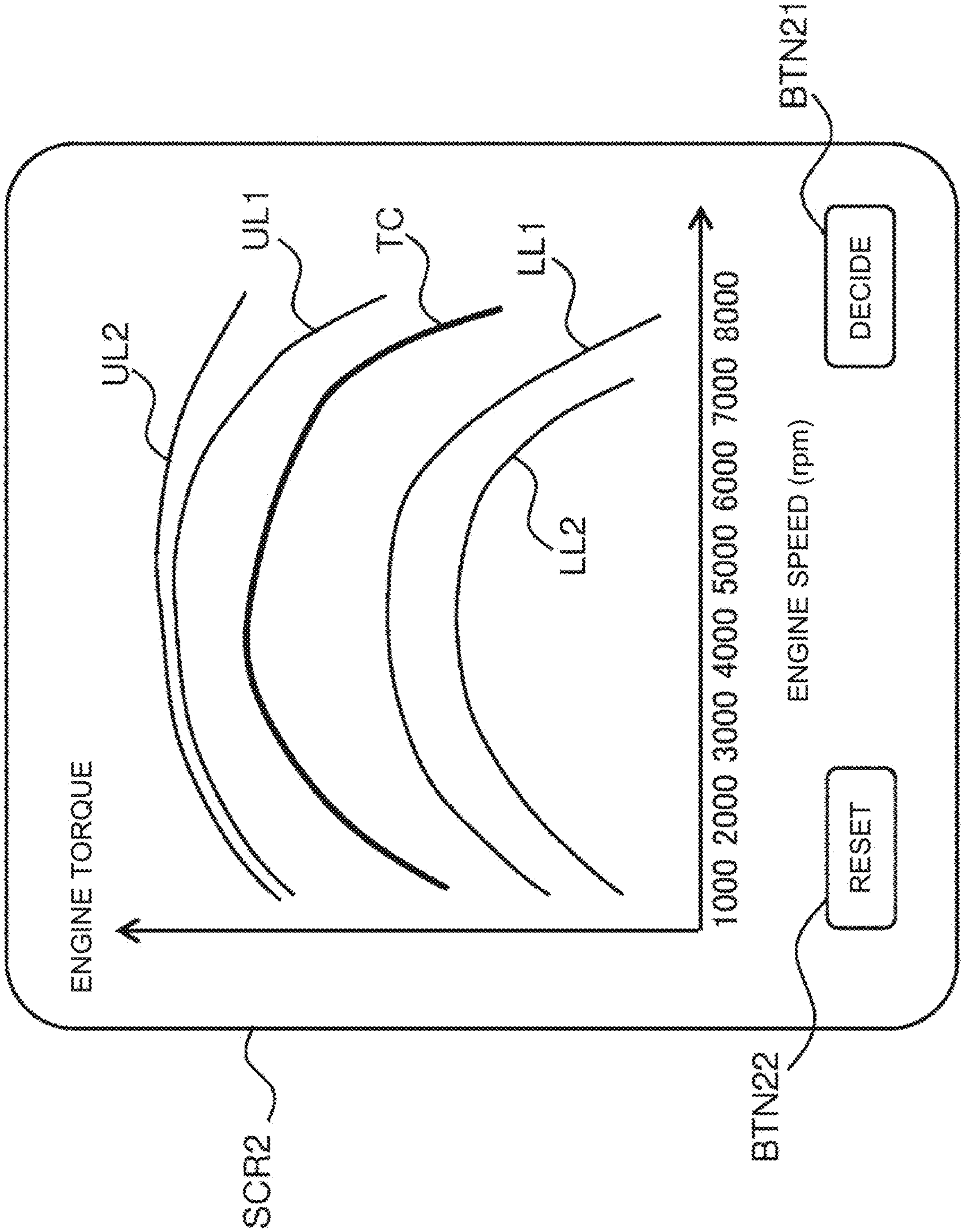
FIG. 12 illustrates an example of the method of customizing engine characteristics by operating the HMI.

Next, a method of customizing the engine characteristics of a manual-transmission internal combustion engine vehicle to be replicated by the battery electric vehicle 100 will be described as another specific example with reference to FIGS. 10 to 12.

Figure 10:
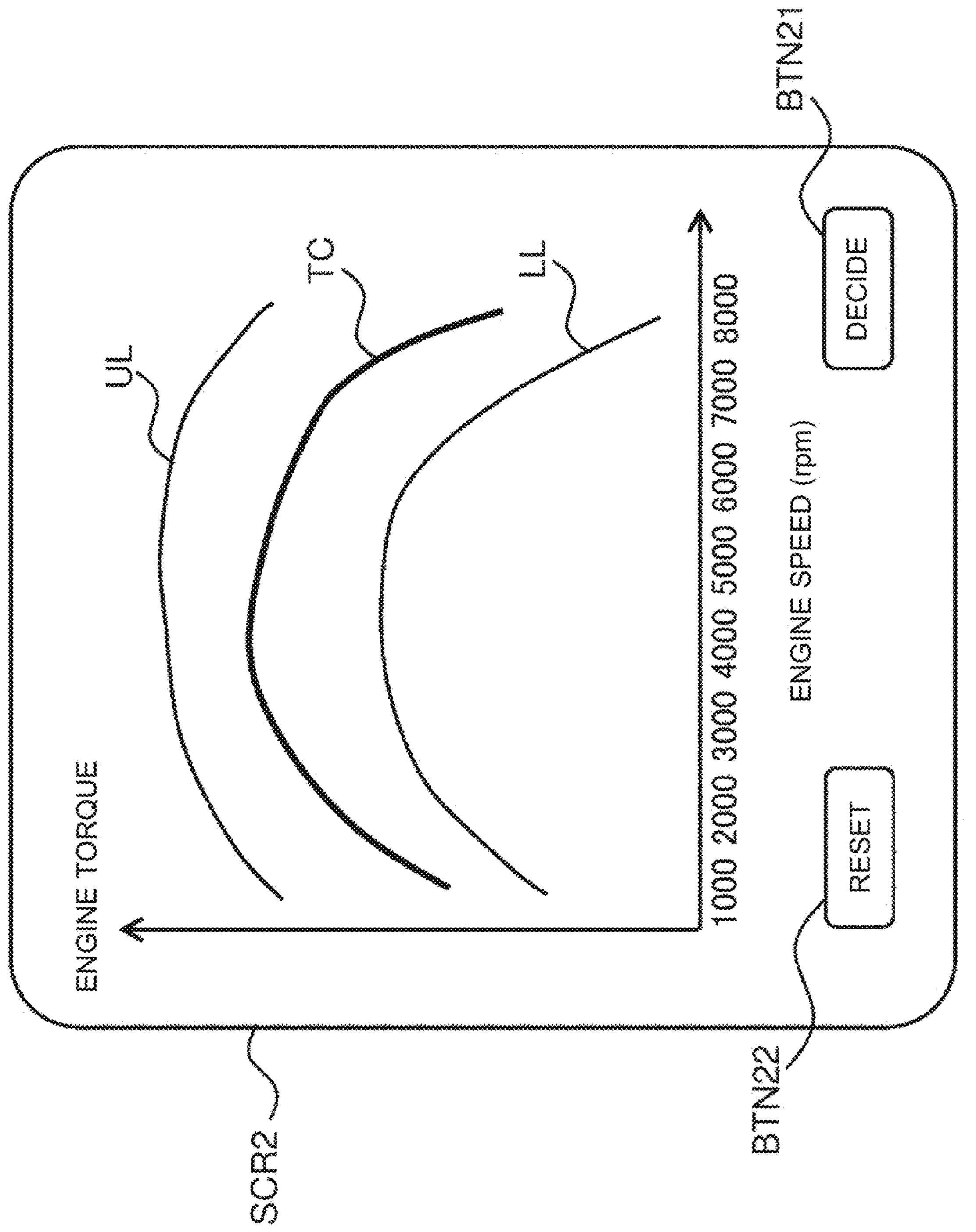
FIG. 10 illustrates an example of a method of customizing engine characteristics by operating the HMI.

First, when the user selects the option "customize" CM331 or the option "customize" CM332, a screen SCR2 such as that illustrated in FIG. 10 is displayed on the touch panel display of the HMI 120. A characteristics chart that indicates the relationship between the engine speed and engine torque is displayed on the screen SCR2. This characteristics chart corresponds to the engine speed-engine torque map that is used by the engine model MOD11. In the characteristics chart, a torque curve TC that is currently set and an upper limit UL and a lower limit LL of engine torque with respect to the engine speed are indicated. A decide button BTN 21 and a reset button BTN22 are displayed on the screen SCR2, together with the characteristics chart.

The user can directly edit the characteristics chart of engine torque with respect to the engine speed on the screen SCR2. For example, when it is desired to increase engine torque in the high rotation range, it is only necessary to drag an end portion of the torque curve TC on the high rotation side upward using a finger F01 as illustrated in FIG. 11. This allows the torque curve TC in the high rotation range to move upward as a whole to change the engine characteristics to a high rotation type. The user can customize the torque curve TC to a desired shape between the upper limit UL and the lower limit LL. When customization is successfully made to the user's favorite engine characteristics as a whole, the customized engine characteristics are registered in the memory 103 as the customized setting by clicking the decide button BTN21 with the finger F01. When it is desired to start the customization all over again, on the other hand, the torque curve TC on the characteristics chart is returned to the original shape by clicking the reset button BTN22 with the finger F01.

By operating the HMI 120 as described above, the user can customize the engine characteristics of a manual-transmission internal combustion engine vehicle to be replicated by the battery electric vehicle 100 to his/her favorite shifting characteristics. In the vehicle characteristics customization system, however, conditions of engine characteristics that are suitable for the battery electric vehicle 100 are determined in advance, as with the customization of the shifting characteristics. For example, it is determined that setting in which engine torque abruptly increases in the high rotation range and setting in which engine torque abruptly decreases in the medium rotation range are outside the suitable range for the battery electric vehicle 100. When customized setting of the engine characteristics is outside the suitable range, registration of the customized setting is canceled, and setting of the motion characteristics of the battery electric vehicle 100 as a manual-transmission internal combustion engine vehicle is maintained at the present setting or the default setting.

The engine characteristics of a manual-transmission internal combustion engine vehicle include engine characteristics that can be easily handled by even beginner drivers and engine characteristics that can only be handled by skilled drivers with some driving experience. This also applies to the case where the battery electric vehicle 100 replicates the engine characteristics of a manual-transmission internal combustion engine vehicle. When the engine characteristics of the battery electric vehicle 100 can be customized and customization for skilled drivers can be made for even beginner drivers, driving may be difficult, depending on the content of the customization. However, limiting the customizable range to characteristics for beginner drivers would not make it possible to meet demands from skilled drivers to try various engine characteristics.

In order to meet the demands from skilled drivers while avoiding a situation in which beginner drivers have difficulty in driving, the upper limit and the lower limit of engine torque with respect to the engine speed are changed according to a history of driving in the manual mode by the user. Specifically, as illustrated in FIG. 12, a first upper limit UL1 and a second upper limit UL2 higher than the first upper limit UL1 are prepared as upper limits for the torque curve TC. In addition, a first lower limit LL1 and a second lower limit LL2 lower than the first lower limit LL1 are prepared as lower limits for the torque curve TC. A range from the first lower limit LL1 to the first upper limit UL1 is used as a settable range for customized setting for users with little driving experience in the manual mode, that is, beginner drivers. A range from the second lower limit LL2 to the second upper limit UL2 is used as a settable range for customized setting for users with much driving experience in the manual mode, that is, skilled drivers. The history of driving in the manual mode may be obtained by accumulating the driving distance in the manual mode, or may be obtained by accumulating the driving time in the manual mode, for example.

Changing the settable range for customized setting according to the history of driving in the manual mode is also applicable to the customization of the shifting characteristics discussed above. In addition, the method of customizing the shifting characteristics and the method of customizing the engine characteristics discussed above are also applicable to the customization of the other vehicle characteristics such as an engine sound and suspension characteristics.

6-4. Process Flow

Figure 13:
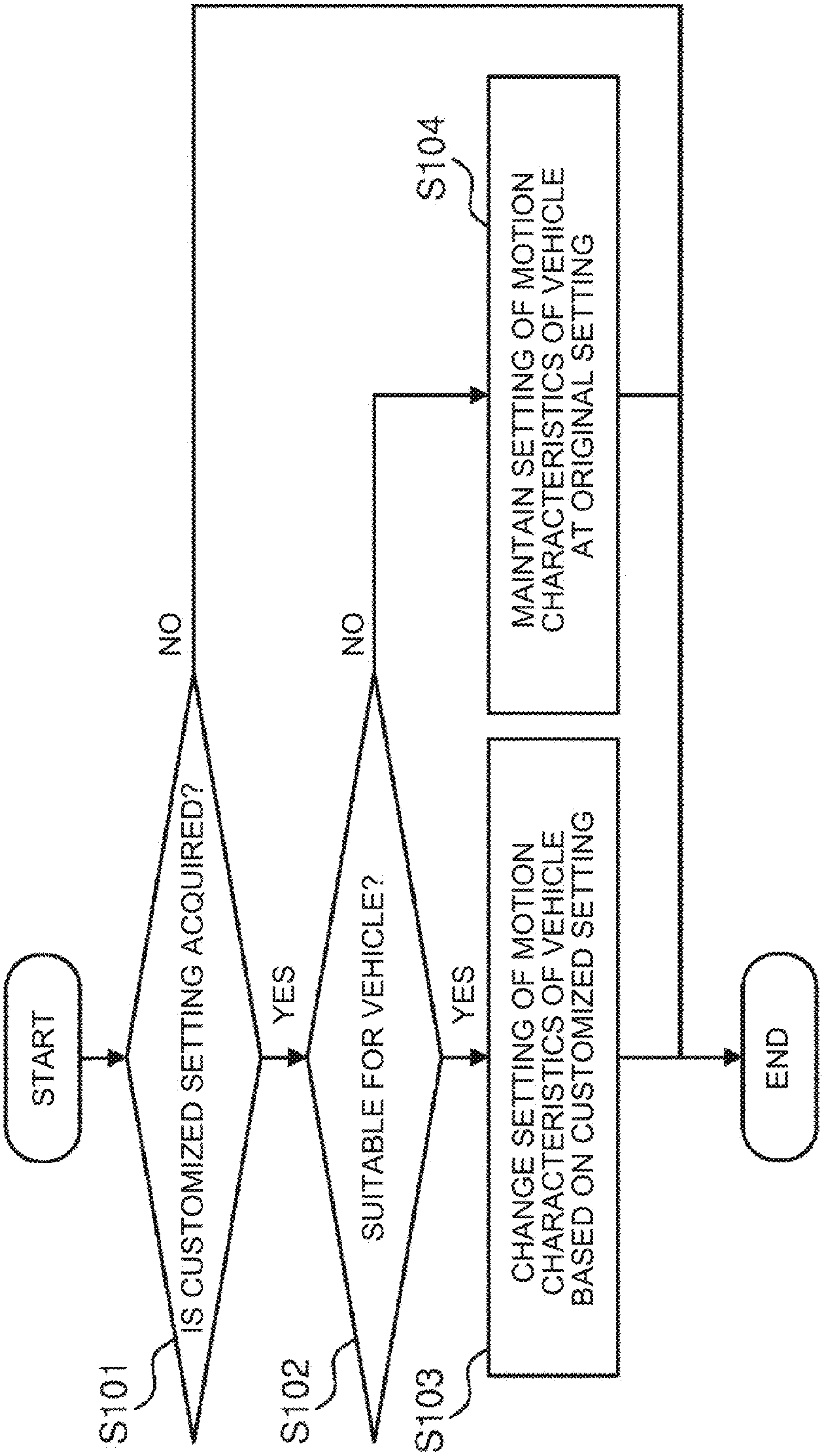
FIG. 13 is a flowchart illustrating a process executed by a vehicle characteristics customization system.

The above process executed by the vehicle characteristics customization system can be represented by a flowchart illustrated in FIG. 13. The control device 101 that constitutes the vehicle characteristics customization system executes the routine indicated in this flowchart at predetermined intervals.

In the flowchart, in step S101, it is determined whether customized setting is acquired by the HMI 120. When customized setting is acquired, it is meant that setting customized by the user is input to the HMI 120. In a specific example, it is determined that customized setting is acquired when the decide button BTN11 is clicked in the case of "6-3-1. Method of Customizing Shifting Characteristics." The subsequent processes are skipped before customized setting is acquired.

When customized setting is acquired, step S102 is executed. In step S102, it is determined whether the acquired customized setting is suitable for the battery electric vehicle 100. When customized setting that is suitable for the battery electric vehicle 100 is acquired, setting of the motion characteristics of the battery electric vehicle 100 as a manual-transmission internal combustion engine vehicle is changed based on the customized setting in step S103. If the acquired customized setting is not suitable for the battery electric vehicle 100, however, setting of the motion characteristics of the battery electric vehicle 100 as a manual-transmission internal combustion engine vehicle is maintained at the original setting in step S104. This allows the user to enjoy customizing the vehicle characteristics without causing a situation in which the battery electric vehicle 100 becomes unable to travel.

7. Vehicle Characteristics Customization System with Use of Mobile Terminal

7-1. Overview

In the embodiment discussed above, the vehicle characteristics customization system is constituted by the control device 101 and the HMI 120 mounted on the battery electric vehicle 100. With such a configuration, the user can customize the vehicle characteristics of a manual-transmission internal combustion engine vehicle to be replicated by the battery electric vehicle 100 while riding on the battery electric vehicle 100. However, some users may desire to make customization outside the battery electric vehicle 100. For example, if customization is completed at home, the battery electric vehicle 100 can replicate the vehicle characteristics of a desired manual-transmission internal combustion engine vehicle immediately after a user rides into the battery electric vehicle 100.

A portable terminal can be used as a tool for making customization outside the battery electric vehicle 100. A vehicle characteristics customization system in which a portable terminal is used can be constructed by enabling customized setting prepared using the portable terminal to be downloaded to the battery electric vehicle 100. Typical examples of the portable terminal include a smartphone and a tablet personal computer (PC). Two examples of a process executed by the vehicle characteristics customization system in which a portable terminal is used will be described below.

Figure 14:
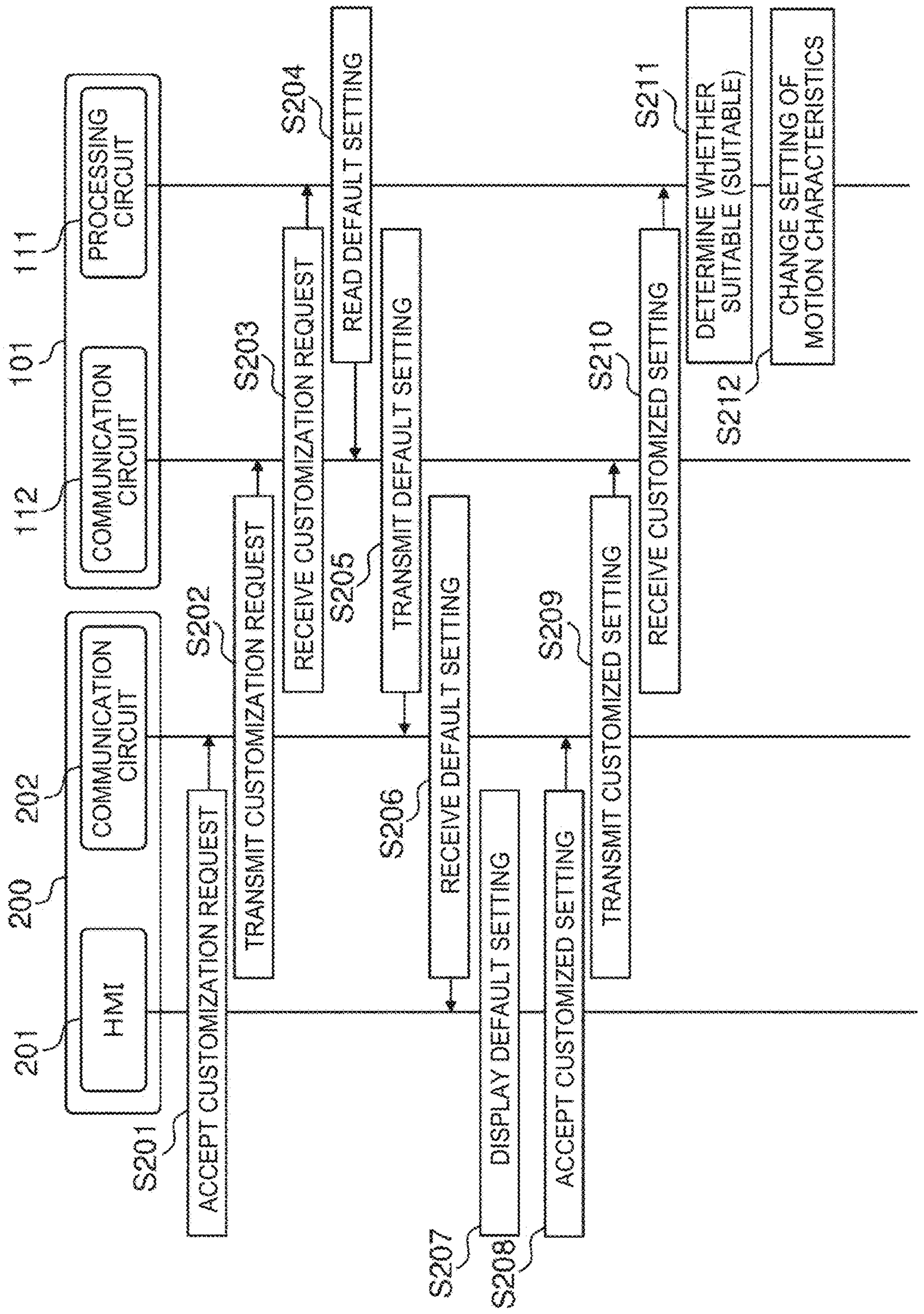
FIG. 14 is a flowchart for a mobile terminal and the vehicle control device, illustrating an example of a process executed by a vehicle characteristics customization system using the mobile terminal.

7-2. First Example of Process Executed by Vehicle Characteristics Customization System FIG. 14 is a flowchart for the mobile terminal and the vehicle control device according to a first example. The flowchart illustrates a process executed by the vehicle characteristics customization system in which a portable terminal is used. In the vehicle characteristics customization system in which a portable terminal is used, communication is performed between a portable terminal 200 and the control device 101. The portable terminal 200 includes an HMI 201 and a communication circuit 202. However, the HMI 201 includes not only hardware that includes the touch panel display, but also software that displays a screen on the touch panel display. The control device 101 includes a processing circuit 111 and a communication circuit 112. The processing circuit 111 is composed of the processor 102 and the memory 103. A first example of the process performed between the portable terminal 200 and the control device 101 will be described below with reference to the flowchart.

In step S201, the HMI 201 of the portable terminal 200 accepts a customization request from the user. The customization request accepted by the HMI 201 is sent to the communication circuit 202. In step S202, the communication circuit 202 transmits the customization request to the control device 101.

In step S203, the communication circuit 112 of the control device 101 receives the customization request transmitted from the portable terminal 200. The customization request received by the communication circuit 112 is input to the processing circuit 111. In step S204, the processing circuit 111 reads, from the memory 103, default setting of vehicle characteristics for which customization is requested, upon receiving an input of the customization request. The read default setting is sent to the communication circuit 112. In step S205, the communication circuit 112 transmits the default setting to the portable terminal 200. While default setting is read here, the currently registered customized setting may be read, depending on the request from the user, if customized setting is already registered.

In step S206, the communication circuit 202 of the portable terminal 200 receives the default setting transmitted from the control device 101. The default setting received by the communication circuit 202 is sent to the HMI 201. In step S207, the HMI 201 displays the default setting on the screen. The user customizes the vehicle characteristics of a manual-transmission internal combustion engine vehicle to be replicated by the battery electric vehicle 100 with reference to the default setting displayed on the screen of the HMI 201.

In step S208, the HMI 201 accepts customized setting from the user. The customized setting accepted by the HMI 201 is sent to the communication circuit 202. In step S209, the communication circuit 202 transmits the customized setting to the control device 101.

In step S210, the communication circuit 112 of the control device 101 receives the customized setting transmitted from the portable terminal 200. The customized setting received by the communication circuit 112 is input to the processing circuit 111. In step S211, the processing circuit 111 determines whether the customized setting is suitable for the battery electric vehicle 100. Here, it is assumed that the customized setting is suitable for the battery electric vehicle 100. In step S212, the processing circuit 111 changes setting of the motion characteristics of the battery electric vehicle 100 as a manual-transmission internal combustion engine vehicle based on the customized setting.

Figure 15:
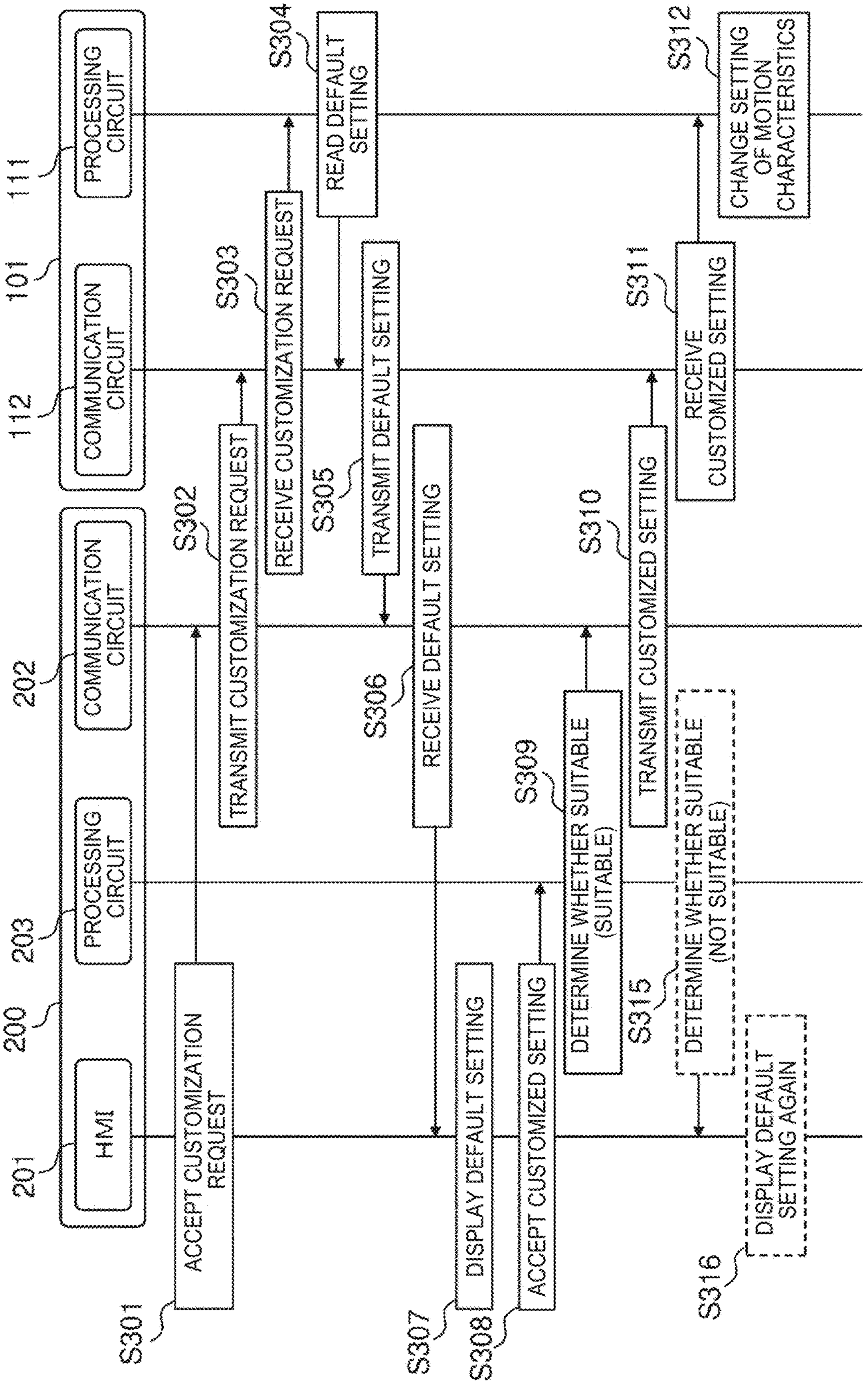
FIG. 15 is a flowchart for the mobile terminal and the vehicle control device, illustrating another example of the process executed by the vehicle characteristics customization system using the mobile terminal.

7-3. Second Example of Process Executed by Vehicle Characteristics Customization System FIG. 15 is a flowchart for the mobile terminal and the vehicle control device according to a second example. The flowchart illustrates a process executed by the vehicle characteristics customization system in which a portable terminal is used. In the second example, the portable terminal 200 includes an HMI 201, a communication circuit 202, and a processing circuit 203. The processing circuit 203 is composed of a processor and a memory. The control device 101 includes a processing circuit 111 and a communication circuit 112. A second example of the process performed between the portable terminal 200 and the control device 101 will be described below with reference to the flowchart.

In step S301, the HMI 201 of the portable terminal 200 accepts a customization request from the user. The customization request accepted by the HMI 201 is sent to the communication circuit 202. In step S302, the communication circuit 202 transmits the customization request to the control device 101.

In step S303, the communication circuit 112 of the control device 101 receives the customization request transmitted from the portable terminal 200. The customization request received by the communication circuit 112 is input to the processing circuit 111. In step S304, the processing circuit 111 reads, from the memory 103, default setting of vehicle characteristics for which customization is requested, upon receiving an input of the customization request. The read default setting is sent to the communication circuit 112. In step S305, the communication circuit 112 transmits the default setting to the portable terminal 200.

In step S306, the communication circuit 202 of the portable terminal 200 receives the default setting transmitted from the control device 101. The default setting received by the communication circuit 202 is sent to the HMI 201. In step S307, the HMI 201 displays the default setting on the screen. The user customizes the vehicle characteristics of a manual-transmission internal combustion engine vehicle to be replicated by the battery electric vehicle 100 with reference to the default setting displayed on the screen of the HMI 201.

In step S308, the HMI 201 accepts customized setting from the user. The customized setting accepted by the HMI 201 is input to the processing circuit 203. In step S309, the processing circuit 203 determines whether the customized setting is suitable for the battery electric vehicle 100. A filter prepared for the specifications of the battery electric vehicle 100 is used for the determination. The specifications of the battery electric vehicle 100 affect the determination as to whether the customized setting is suitable for the battery electric vehicle 100. The processing circuit 203 acquires identification information on the battery electric vehicle 100 from the control device 101 that the portable terminal 200 is communicating with, and selects a filter to be used based on the identification information.

When the customized setting is suitable for the battery electric vehicle 100, the customized setting is sent to the communication circuit 202. In step S310, the communication circuit 202 transmits the customized setting to the control device 101.

When the processing circuit 203 determines that the customized setting is not suitable for the battery electric vehicle 100 (step S315), on the other hand, the HMI 201 displays the default setting again on the screen (step S316). The user again customizes the vehicle characteristics of a manual-transmission internal combustion engine vehicle to be replicated by the battery electric vehicle 100 with reference to the default setting displayed again on the screen of the HMI 201.

In step S311, the communication circuit 112 of the control device 101 receives the customized setting transmitted from the portable terminal 200. The customized setting received by the communication circuit 112 is input to the processing circuit 111. In step S312, the processing circuit 111 changes setting of the motion characteristics of the battery electric vehicle 100 as a manual-transmission internal combustion engine vehicle based on the customized setting.

8. Vehicle Characteristics Customization System with Use of Gaming Device

8-1. Overview

In driving simulator video games, a user can customize a virtual vehicle that he/she operates in the video game to his/her favorite vehicle characteristics. A vehicle characteristics customization system in which a gaming device is used can be constructed by connecting a gaming device on which such a video game can be played to the battery electric vehicle 100 so that customized setting of a virtual vehicle prepared in the video game can be uploaded to the battery electric vehicle 100.

Figure 16:
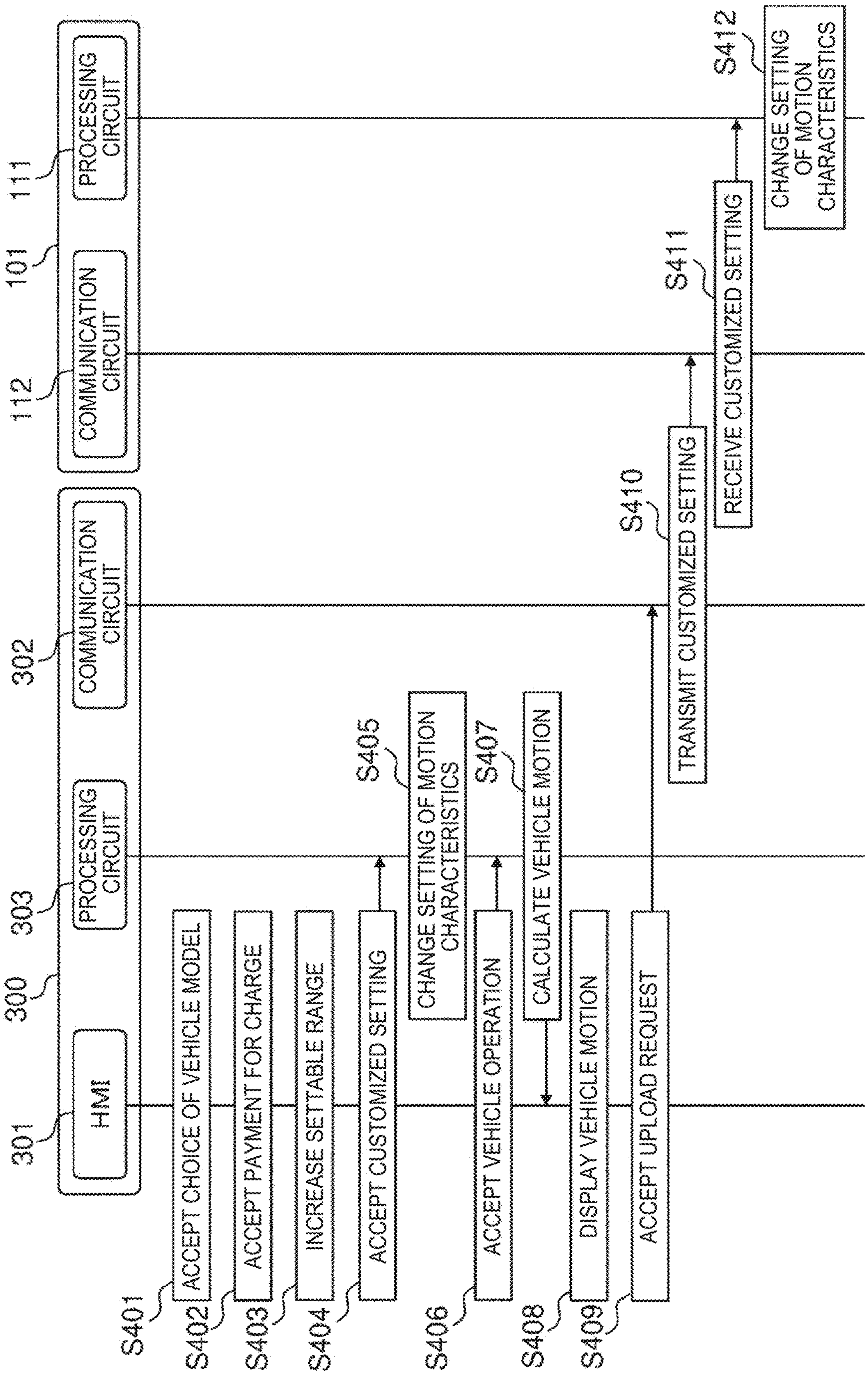
FIG. 16 is a flowchart for a gaming device and the vehicle control device, illustrating an example of a process executed by a vehicle characteristics customization system using the gaming device.

8-2. Example of Process Executed by Vehicle Characteristics Customization System FIG. 16 is a flowchart for the gaming device and the vehicle control device. The flowchart illustrates a process executed by the vehicle characteristics customization system in which a gaming device is used. In the vehicle characteristics customization system in which a gaming device is used, communication is performed between a gaming device 300 and the control device 101. The gaming device 300 includes an HMI 301, a communication circuit 302, and a processing circuit 303. However, the HMI 301 includes not only hardware that includes the touch panel display, but also software that displays a screen on the touch panel display. The control device 101 includes a processing circuit 111 and a communication circuit 112. An example of the process performed between the gaming device 300 and the control device 101 will be described below with reference to the flowchart.

In step S401, the HMI 301 of the gaming device 300 accepts a choice of a vehicle model to be customized by the user. A plurality of vehicle models of the battery electric vehicle 100 to be customized is registered in a video game to be played on the gaming device 300. The user can select a vehicle model of the battery electric vehicle 100 that he/she desires to customize, from among the registered vehicle models.

In step S402, the HMI 301 accepts payment for a charge from the user. By paying a charge for the video game, the user can increase the types of vehicle characteristics that can be customized, or increase the settable range for customized setting. This is described with reference to FIG. 12. While the torque curve TC cannot be changed when no charge is paid, paying a certain amount of charge may allow customizing the torque curve TC in the range from the first lower limit LL1 to the first upper limit UL1, and paying another certain amount of charge may allow customizing the torque curve TC in the range from the second lower limit LL2 to the second upper limit UL2, for example. In step S403, the HMI 301 increases the settable range for customized setting according to the amount of charge from the user.

In step S404, the HMI 301 accepts customized setting from the user. The customized setting accepted by the HMI 301 is input to the processing circuit 303. In step S405, the processing circuit 303 changes setting of the motion characteristics of the virtual vehicle in the video game based on the customized setting. In step S406, the HMI 301 accepts an operation on the virtual vehicle by the user. The operation of the virtual vehicle accepted by the HMI 301 is input to the processing circuit 303. In step S407, the processing circuit 303 calculates motion of the virtual vehicle in the video game based on the input operation. The result of calculation of the motion of the virtual vehicle by the processing circuit 303 is sent to the HMI 301.

In step S408, the HMI 301 displays the motion of the virtual vehicle in the video game on the screen. The user watches the motion of the virtual vehicle displayed on the screen of the HMI 301, and determines whether the customized setting made by the user himself/herself is satisfactory. The user can repeatedly perform steps S404, S406, and S408 until a satisfactory result can be obtained. Here, it is assumed that a result that is satisfactory to the user has been obtained in the customized setting.

In step S409, the HMI 301 accepts a request to upload the customized setting from the user. The customized setting for which upload is requested on the HMI 301 is sent to the communication circuit 302. In step S410, the communication circuit 302 transmits the customized setting to the control device 101.

In step S411, the communication circuit 112 of the control device 101 receives the customized setting transmitted from the gaming device 300. The customized setting received by the communication circuit 112 is input to the processing circuit 111. In step S412, the processing circuit 111 changes setting of the motion characteristics of the battery electric vehicle 100 as a manual-transmission internal combustion engine vehicle based on the customized setting.

9. Effects

With the vehicle characteristics customization system according to the present embodiment, the user can customize the setting of the vehicle characteristics of a manual-transmission internal combustion engine vehicle to be replicated by the battery electric vehicle 100 to his/her taste using the HMI. However, the customized setting made using the HMI is not unconditionally applied to the battery electric vehicle 100, and it is determined whether the customized setting is suitable for the battery electric vehicle. When the customized setting is not suitable for the battery electric vehicle 100, setting of the motion characteristics of the battery electric vehicle 100 as a manual-transmission internal combustion engine vehicle is maintained at the present setting or the default setting. This allows the user to enjoy customizing the vehicle characteristics without causing a situation in which the battery electric vehicle 100 becomes unable to travel.

10. Other Embodiments

In another configuration, the battery electric vehicle 100 may include only the pseudo H-shifter 24 and the pseudo clutch pedal 26 without including the pseudo paddle shifter 25. In still another configuration, the battery electric vehicle 100 may include only the pseudo paddle shifter 25 without including the pseudo H-shifter 24 or the pseudo clutch pedal 26. In yet another configuration, the battery electric vehicle 100 may include only the pseudo H-shifter 24 without including the pseudo paddle shifter 25 or the pseudo clutch pedal 26.

What is claimed is:

1. A battery electric vehicle that includes an electric motor as a drive source, comprising:

an accelerator pedal that is used to drive the battery electric vehicle;

a pseudo shifter that imitates a shifter that is used to perform a shifting operation of a manual-transmission internal combustion engine vehicle; and a control device configured to control motion of the battery electric vehicle with respect to an operation of the accelerator pedal according to an operation state of the pseudo shifter, wherein the control device is configured to acquire customized setting of vehicle characteristics of the manual-transmission internal combustion engine vehicle to be replicated by the battery electric vehicle, wherein the customized setting includes a gear ratio for each virtual shift position selected by a driver's operation on the pseudo shifter, change setting of motion characteristics of the battery electric vehicle with respect to the operation of the accelerator pedal and an operation of the pseudo shifter based on the customized setting when the customized setting of the gear ratio meets a predetermined criterion for the battery electric vehicle, and maintain the setting of the motion characteristics at present setting or default setting when the customized setting of the gear ratio does not meet the predetermined criterion for the battery electric vehicle, wherein the case where the customized setting of the gear ratio does not meet the predetermined criterion includes either that a gear ratio of N+1 gear, where N is greater than or equal to 1, is set higher than a gear ratio of N gear or that the gear ratios of adjacent shift positions are unacceptably wide.

2. The battery electric vehicle according to claim 1, wherein the control device is configured to present, to a user, a settable range for customizing from the present setting or the default setting.

3. The battery electric vehicle according to claim 1, wherein:

the accelerator pedal is configured to control torque of the electric motor;

the pseudo shifter imitates a shifter of a manual transmission; and the customized setting further includes a relationship among a vehicle speed of a host vehicle, an operation amount of the accelerator pedal, a shift position selected by an operation of the pseudo shifter, and torque of the electric motor.

4. The battery electric vehicle according to claim 1, wherein:

the accelerator pedal is configured to control torque of the electric motor;

the pseudo shifter includes a shift lever that imitates a shifter of a manual transmission, and a pseudo clutch operation device that imitates a clutch operation device; and the customized setting further includes a relationship among a vehicle speed of a host vehicle, an operation amount of the accelerator pedal, a shift position selected by an operation of the shift lever, an operation amount of the pseudo clutch operation device, and torque of the electric motor.

5. The battery electric vehicle according to claim 4, wherein the customized setting includes whether the pseudo clutch operating device is used.

6. The battery electric vehicle according to claim 4, wherein:

the shift lever includes a pseudo sequential shifter that imitates a sequential shifter of the manual transmission, and a pseudo H-shifter that imitates an H-shifter of the manual transmission; and the customized setting includes whether the pseudo sequential shifter or the pseudo H-shifter is used.

7. The battery electric vehicle according to claim 1, wherein the customized setting includes at least one of settings of engine characteristics, shifting characteristics, and suspension characteristics of the manual-transmission internal combustion engine vehicle.

8. A vehicle characteristics customization system that customizes vehicle characteristics, the vehicle characteristics customization system comprising:

the battery electric vehicle according to claim 1;

a human-machine interface configured to set the customized setting of vehicle characteristics of the manual-transmission internal combustion engine to be replicated by the battery electric vehicle; and a processing circuit configured to communicate with the human-machine interface, wherein the processing circuit is configured to determine whether the customized setting set by using the human-machine interface is suitable for the battery electric vehicle, change the setting of motion characteristics of the battery electric vehicle with respect to operations of the accelerator pedal and the pseudo shifter based on the customized setting when the customized setting is suitable for the battery electric vehicle, and maintain the setting of the motion characteristics at present setting or default setting when the customized setting is not suitable for the battery electric vehicle.

9. The vehicle characteristics customization system according to claim 8, wherein:

the human-machine interface includes a touch panel display; and the human-machine interface is configured to display a characteristics chart that indicates the vehicle characteristics of the manual-transmission internal combustion engine vehicle on the touch panel display, enable a user to alter the characteristics chart on the touch panel display through a touch operation, and accept the altered characteristics chart as the customized setting.

10. The vehicle characteristics customization system according to claim 8, wherein the processing circuit is configured to present, to a user, a settable range for customizing from the present setting or the default setting via the human-machine interface.

11. The vehicle characteristics customization system according to claim 8, wherein the processing circuit is configured to:

record a history of driving performed by a driver using the pseudo shifter; and increase a settable range for the customized setting on the human-machine interface according to the history of driving.

12. The vehicle characteristics customization system according to claim 8, wherein the human-machine interface is mounted on a portable terminal configured to be connected to the battery electric vehicle wirelessly or through a wire.

13. The vehicle characteristics customization system according to claim 12, wherein:

the processing circuit is mounted on the battery electric vehicle.

14. The vehicle characteristics customization system according to claim 12, wherein:

a part of the processing circuit is mounted on the portable terminal; and the part of the processing circuit is configured to determine, using a filter prepared for each battery electric vehicle, whether the customized setting set using the human-machine interface is suitable for the battery electric vehicle, and upload the customized setting determined as being suitable for the battery electric vehicle to the battery electric vehicle.

15. The vehicle characteristics customization system according to claim 8, wherein:

the human-machine interface is mounted on a gaming device configured to be connected to the battery electric vehicle wirelessly or through a wire; and the human-machine interface is configured to enable vehicle characteristics of a virtual vehicle set by a user in a video game that operates on the gaming device to be set as the customized setting.

16. The vehicle characteristics customization system according to claim 15, wherein the video game includes:

a mode to select a battery electric vehicle for which the customized setting is to be uploaded; and a mode to set vehicle characteristics of the virtual vehicle using a filter for the selected battery electric vehicle.

17. The vehicle characteristics customization system according to claim 15, wherein the human-machine interface is configured to increase a settable range for the customized setting according to an amount of charge paid for the video game by the user.

18. The vehicle characteristics customization system according to claim 8, wherein the human-machine interface and the processing circuit are mounted on the battery electric vehicle.

19. A battery electric vehicle that includes an electric motor as a drive source, comprising:

an accelerator pedal that is used to drive the battery electric vehicle;

a pseudo shifter that imitates a shifter that is used to perform a shifting operation of a manual-transmission internal combustion engine vehicle; and a control device configured to control motion of the battery electric vehicle with respect to an operation of the accelerator pedal according to an operation state of the pseudo shifter, wherein the control device is configured to acquire customized setting of vehicle characteristics of the manual-transmission internal combustion engine vehicle to be replicated by the battery electric vehicle, wherein the customized setting includes engine characteristics defining a relationship of engine torque with respect to engine speed of a manual-transmission internal combustion engine vehicle to be replicated by the battery electric vehicle, change setting of motion characteristics of the battery electric vehicle with respect to the operation of the accelerator pedal and an operation of the pseudo shifter based on the customized setting when the customized setting of the engine characteristics meets a predetermined criterion for the battery electric vehicle, and maintain the setting of the motion characteristics at present setting or default setting when the customized setting of the engine characteristics does not meet the predetermined criterion for the battery electric vehicle, wherein the case where the customized setting of the engine characteristics does not meet the predetermined criterion includes either that the engine torque abruptly increases in a high rotation range or the engine torque abruptly decreases in a medium rotation range.

* * * * *